US010564287B2

(12) United States Patent
Nakata et al.

(10) Patent No.: US 10,564,287 B2
(45) Date of Patent: Feb. 18, 2020

(54) POSITIONAL MEASUREMENT SYSTEM, POSITIONAL MEASUREMENT METHOD, AND MOBILE ROBOT

(71) Applicant: Panasonic Intellectual Property Corporation of America, Torrance, CA (US)

(72) Inventors: Yohei Nakata, Osaka (JP); Kazuma Takeuchi, Osaka (JP); Masahiko Saito, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 210 days.

(21) Appl. No.: 15/667,417

(22) Filed: Aug. 2, 2017

(65) Prior Publication Data
US 2018/0059250 A1 Mar. 1, 2018

(30) Foreign Application Priority Data

Aug. 31, 2016 (JP) .................................. 2016-169576
May 8, 2017 (JP) .................................. 2017-092577

(51) Int. Cl.
*G01S 19/07* (2010.01)
*G01S 19/10* (2010.01)
(Continued)

(52) U.S. Cl.
CPC .............. *G01S 19/07* (2013.01); *G01S 1/042* (2013.01); *G01S 5/009* (2013.01); *G01S 19/10* (2013.01);
(Continued)

(58) Field of Classification Search
None
See application file for complete search history.

(56) References Cited

U.S. PATENT DOCUMENTS

2012/0326923 A1 12/2012 Oehler et al.
2014/0210663 A1 7/2014 Metzler
(Continued)

FOREIGN PATENT DOCUMENTS

JP        2001-235532        8/2001

OTHER PUBLICATIONS

The Extended European Search Report dated Jan. 19, 2018 for European Patent Application No. 17184664.5.
(Continued)

*Primary Examiner* — Whitney Moore
(74) *Attorney, Agent, or Firm* — Greenblum & Bernstein, P.L.C.

(57) ABSTRACT

A positional measurement system includes: a mobile robot including a global navigation satellite system (GNSS) signal reception unit that receives GNSS signals and calculates a position of the mobile robot based on the GNSS signals, a GNSS signal precision evaluation unit that evaluates positional measurement precision by the received GNSS signals, and a position control unit that moves the mobile robot to a high-precision reception position, where GNSS signals yielding positional measurement precision higher than a first threshold precision can be received; a relative position detection unit that detects a relative position of a target as to the mobile robot situated at the high-precision reception position; and a target position calculation unit that calculates a position of the target based on the calculated position of the mobile robot based on the GNSS signals received at the high-precision reception position, and the relative position.

13 Claims, 13 Drawing Sheets

(51) Int. Cl.
*G01S 1/04* (2006.01)
*G01S 19/39* (2010.01)
*G01S 5/00* (2006.01)
*G01S 19/25* (2010.01)
*G01S 19/33* (2010.01)
*G01S 19/42* (2010.01)
*G01S 19/46* (2010.01)
*G01S 19/48* (2010.01)
*G01S 19/51* (2010.01)

(52) U.S. Cl.
CPC .............. *G01S 19/25* (2013.01); *G01S 19/33* (2013.01); *G01S 19/39* (2013.01); *G01S 19/425* (2013.01); *G01S 19/46* (2013.01); *G01S 19/48* (2013.01); *G01S 19/51* (2013.01); *G01S 5/0009* (2013.01)

(56) References Cited

U.S. PATENT DOCUMENTS

| | | | |
|---|---|---|---|
| 2014/0371952 A1* | 12/2014 | Ohtomo | B64C 39/024 701/2 |
| 2017/0118688 A1* | 4/2017 | Guvenc | H04W 36/20 |

OTHER PUBLICATIONS

Communication under Rule 71(3) EPC dated Jun. 14, 2019 for the related European Patent Application No. 17184664.5.

\* cited by examiner

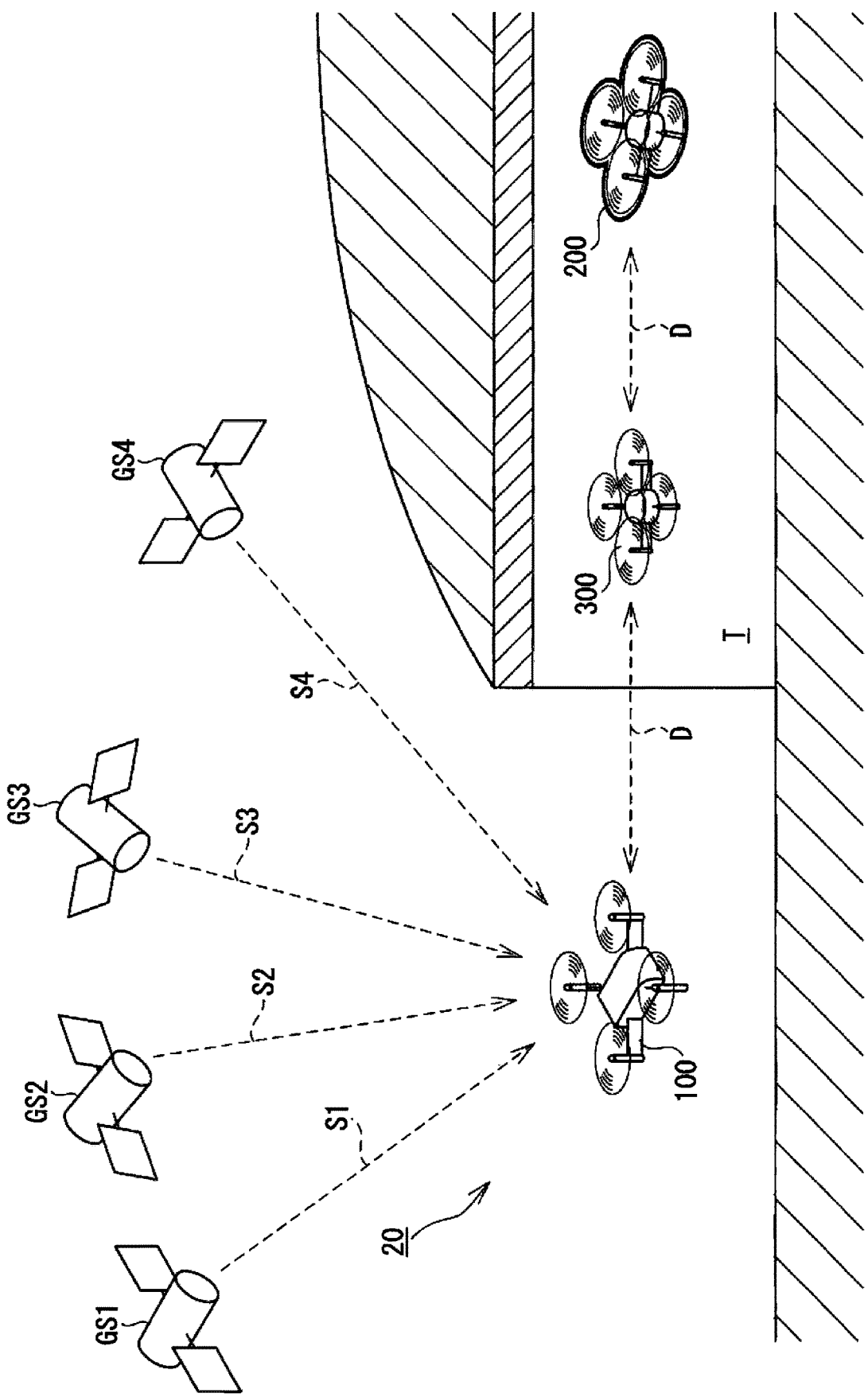

POSITIONAL MEASUREMENT SYSTEM, POSITIONAL MEASUREMENT METHOD, AND MOBILE ROBOT

BACKGROUND

1. Technical Field

The present disclosure relates to positional measurement system and positional measurement method for measuring a position of a target such as an inspection robot or the like. The present disclosure also relates to a mobile robot used to measure the position of the target.

2. Description of the Related Art

There conventionally has been performed measurement of positions of targets, such as surveying devices, using signals from a global navigation satellite system (GNSS) such as the Global Positioning System (GPS). There also is known a method to measure the position on a GPS coordinate system (GPS position) of a target disposed at a position where signals from GPS satellites (GPS signals) cannot be received.

For example, the GPS positional measurement method described in Japanese Unexamined Patent Application Publication No. 2001-235532 includes a relay station that receives time information from GPS satellites, and four pseudolite stations that are each installed at known positions and acquire time information from the relay station, and transmit pseudo GPS signals to a measurement station based on the information of the known positions and the time information, in order to measure the GPS position of the measurement station installed in a location where GPS signals cannot be received (a location shielded from GPS signals) or at a location inside a tunnel where GPS signal reception strength is weak. The measurement station determines its own position based on the pseudo GPS signals from these four pseudolite stations.

SUMMARY

In one general aspect, the techniques disclosed here feature a positional measurement system including: a mobile robot including a global navigation satellite system (GNSS) signal reception unit that receives GNSS signals and calculates a position of the mobile robot based on the GNSS signals, a GNSS signal precision evaluation unit that evaluates positional measurement precision by the received GNSS signals, and a position control unit that moves the mobile robot to a high-precision reception position, where GNSS signals yielding positional measurement precision higher than a first threshold precision can be received; a relative position detection unit that detects a relative position of a target as to the mobile robot situated at the high-precision reception position; and a target position calculation unit that calculates a position of the target based on the calculated position of the mobile robot based on the GNSS signals received at the high-precision reception position, and the relative position.

According to the present disclosure, the position of a target at a location shielded from GNSS signals or at a location where reception strength of GNSS signals is weak can be measured with stable precision, using GNSS signals such as GPS signals or the like.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 is a schematic diagram of a positional measurement system according to a second embodiment;

DETAILED DESCRIPTION

Figure 1:
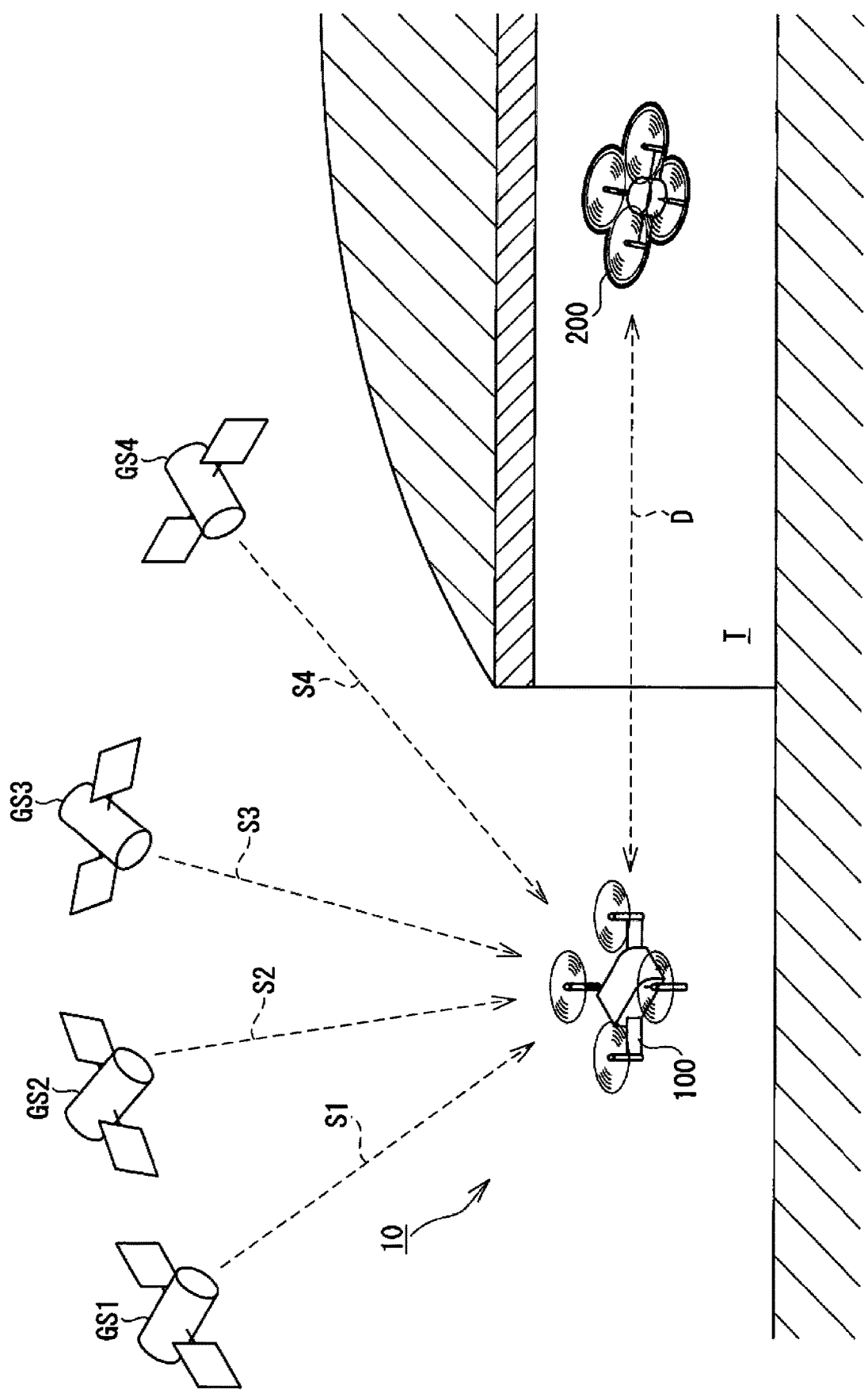
FIG. 1 is a schematic diagram of a positional measurement system according to a first embodiment of the present disclosure.

Underlying Knowledge Forming Basis of the Present Disclosure

In the case of the GPS positional measurement described in Japanese Unexamined Patent Application Publication No. 2001-235532, the certainty of position of the target (measurement station), i.e., the precision of the position of the target is dependent on positional measurement precision of the GPS signals that are transmitted from GPS satellites and received by the relay station. However, positions of the GPS satellites are constantly changing, while the relay station is maintained in a motionless state, so the positional measurement precision by the GPS signals being received also changes. As a result, there is the possibility that the position of the target may not be able to be measured with a stable precision. For example, in a case where the target is a mobile surveying device (e.g., a drone or the like) used for tunnel inspection or the like, not being able to measure the position thereof with stable precision can affect the reliability of the surveying results.

Accordingly, the present disclosure provides positional measurement system, a positional measurement method, and a mobile robot, that measures the position of a target at a location shielded from GNSS signals or at a location where reception strength of GNSS signals is weak with stable precision, using GNSS signals such as GPS signals or the like.

A positional measurement system according to an aspect of the present disclosure includes: a mobile robot including a global navigation satellite system (GNSS) signal reception unit that receives GNSS signals and calculates a position of the mobile robot based on the GNSS signals, a GNSS signal precision evaluation unit that evaluates positional measurement precision by the received GNSS signals, and a position control unit that moves the mobile robot to a high-precision reception position, where GNSS signals yielding positional measurement precision higher than a first threshold precision can be received; a relative position detection unit that detects a relative position of a target as to the mobile robot situated at the high-precision reception position; and a target position calculation unit that calculates a position of the target based on the calculated position of the mobile robot based on the GNSS signals received at the high-precision reception position, and the relative position.

According to this configuration, the position of a target at a location shielded from GNSS signals such as GPS signals or at a location where reception strength of GNSS signals is weak can be measured with stable precision, using GNSS signals.

The target may include a target-side communication unit that communicates with the mobile robot. The mobile robot may further include a mobile-robot-side communication unit that communicates with the target-side communication unit, and a communication channel quality evaluation unit that evaluates quality of a communication channel between the mobile-robot-side communication unit and the target-side communication unit. The position control unit may move the mobile robot to a position that is the high-precision reception position and also is a high-quality communication position where a communication channel of quality higher than a first threshold quality can be established. The relative position detecting unit may detect the relative position of the target as to the mobile robot situated at a position that is the high-precision reception position and the high-quality communication position. The target position calculation unit may calculate the position of the target, based on the calculated position of the mobile robot based on GNSS signals received at the position that is the high-precision reception position and the high-quality communication position, and the relative position. Accordingly, the position of the target can be measured at a stable precision in a case where quality of the communication channel between the mobile robot and the target changes.

The mobile robot may further include an evaluation value map creation unit that creates an evaluation value map including a fitness evaluation value indicating fitness relating to relay of GNSS signals with regard to reception of the GNSS signals and communication with the target, for each position in a space, based on precision evaluation results from the GNSS signal precision evaluation unit and quality evaluation results from the communication channel quality evaluation unit. The position control unit may move the mobile robot to a position of a highest fitness evaluation value, based on the evaluation value map. Accordingly, the mobile robot can be speedily disposed at a position that is a high-precision reception position and also a high-quality communication position (as compared to searching for this position by trial-and-error).

When the mobile robot is situated at the position of the highest fitness evaluation value, the GNSS signal precision evaluation unit may evaluate positional measurement precision by GNSS signals, and also the communication channel quality evaluation unit may evaluate the quality of the communication channel. In a case of a first state where the evaluated positional measurement precision by GNSS signals is higher than the first threshold precision, and the evaluated communication channel quality is higher than the first threshold quality, the target position calculation unit may calculate the position of the target. Accordingly, confirmation is made regarding whether the position of the highest fitness evaluation value matches a position that is a high-precision reception position and also a high-quality communication position, and as a result, the position of the target can be measured at a stable precision in a sure manner.

When the mobile robot is situated at the position of the highest fitness evaluation value, the GNSS signal precision evaluation unit may evaluate positional measurement precision by GNSS signals, and also the communication channel quality evaluation unit may evaluate the quality of the communication channel. In a case of a second state where the evaluated positional measurement precision by GNSS signals is lower than a second threshold precision that is lower than the first threshold precision, and the evaluated communication channel quality is lower than a second threshold quality that is lower than the first threshold quality, the evaluation value map creation unit may update the evaluation value map using the evaluated positional measurement precision by GNSS signals and evaluated communication channel quality. Accordingly, an evaluation value map that matches the newest state is created.

When the mobile robot is situated at the position of the highest fitness evaluation value, the GNSS signal precision evaluation unit evaluates positional measurement precision by GNSS signals, and also the communication channel quality evaluation unit evaluates the quality of the communication channel. In a case of a state that is different from both the first state where the evaluated positional measurement precision by GNSS signals is higher than the first threshold precision, and the evaluated communication channel quality is higher than the first threshold quality, and the second state where the evaluated positional measurement precision by GNSS signals is lower than the second threshold precision that is lower than the first threshold precision, and the evaluated communication channel quality is lower than the second threshold quality that is lower than the first threshold quality, the position control unit may move the mobile robot to change the position. Accordingly, search for a position that is a high-precision reception position and also a high-quality communication position is continued.

The target may include the relative position detecting unit and the target position calculation unit. The position of the mobile robot calculated by the GNSS signal reception unit may be transmitted from the mobile-robot-side communication unit to the target-side communication unit.

The target may further include a second GNSS signal reception unit that receives the GNSS signals and calculates the position of the target based on the GNSS signals. Accordingly, in a case where the target is at a position where GNSS signals can be received, the position of the target can be calculated based on GNSS signals received by the second GNSS signal reception unit.

The target may further include a target position integration unit that integrates positions of the target calculated by each of the target position calculation unit and the second GNSS signal reception unit. Accordingly, the position after integration has high reliability as compared to either of the position calculated by the target position calculation unit and the position calculated by the second GNSS signal reception unit.

The target may further include a target position selection unit that selects a position of the target from positions of the target calculated by each of the target position calculation unit and the second GNSS signal reception unit. Accordingly, a position calculated based on relatively high-precision GNSS signals can be obtained as measurement results.

The target may be mobile, and be a robot that performs surveying using the position of the target. Accordingly, surveying can be performed at stable precision, based on the position of the target measured at stable precision.

The mobile robot may further include a fixing unit that fixes the position thereof. Accordingly, the mobile robot can be kept at the high-precision reception position, so the position of the target can be measured at a more stable precision.

The positional measurement precision may be precision of the calculated position of the mobile robot based on the GNSS signals.

A positional measurement method according to another aspect of the present disclosure includes: receiving GNSS signals by a global navigation satellite system (GNSS) signal reception unit of a mobile robot, and calculating a position of the mobile robot based on the GNSS signals; evaluating positional measurement precision by GNSS signals received by the GNSS signal reception unit; moving the mobile robot to a high-precision reception position, where GNSS signals yielding positional measurement precision higher than a first threshold precision can be received; detecting a relative position of a target as to the mobile robot situated at the high-precision reception position; and calculating a position of the target based on the calculated position of the mobile robot based on the GNSS signals received at the high-precision reception position, and the relative position.

According to this configuration, the position of a target at a location shielded from GNSS signals such as GPS signals or at a location where reception strength of GNSS signals is weak can be measured with stable precision, using GNSS signals.

A mobile robot according to another aspect of the present includes: a global navigation satellite system (GNSS) signal reception unit that receives GNSS signals and calculates a position of the mobile robot to be used for measurement of a position of a target, based on the GNSS signals; a GNSS signal precision evaluation unit that evaluates positional measurement precision by the received GNSS signals; and a position control unit that moves the mobile robot to a high-precision reception position, where GNSS signals yielding positional measurement precision higher than a first threshold precision can be received.

According to this configuration, the position of a target at a location shielded from GNSS signals such as GPS signals or at a location where reception strength of GNSS signals is weak can be measured with stable precision, using GNSS signals.

The mobile robot may further include a relative position detection unit that detects a relative position of the target as to the mobile robot situated at the high-precision reception position.

The mobile robot may further include a target position calculation unit that calculates a position of the target based on the calculated position of the mobile robot based on the GNSS signals received at the high-precision reception position, and the relative position.

Embodiments will now be described in detail with reference to the drawings as appropriate. Note, however, that unnecessarily detailed description may be omitted. For example, detailed description of matters that are well known, and redundant description of configurations that are substantially the same, may be omitted. This is to avoid the following description from becoming unnecessarily lengthy, and to facilitate understanding of those skilled in the art.

Note that the present inventors have provided the attached drawings and the following description to facilitate sufficient understanding of the present disclosure by those skilled in the art, and that the subject matter laid forth in the Claims is not restricted in any way thereby.

First Embodiment

Figure 2:
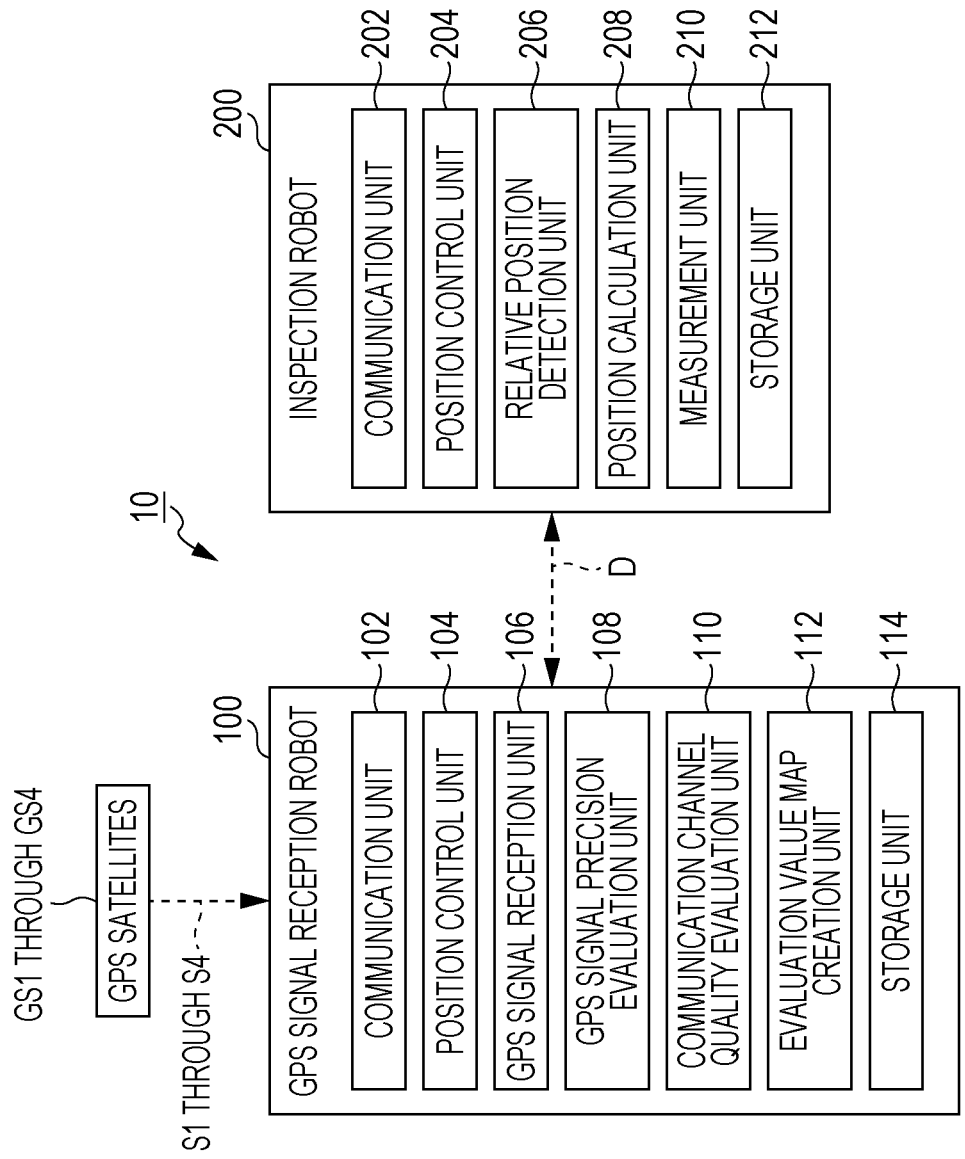
FIG. 2 is a block diagram illustrating the configuration of the positional measurement system according to the first embodiment.

FIG. 1 schematically illustrates a positional measurement system 10 according to a first embodiment. FIG. 2 is a block diagram illustrating the configuration of the positional measurement system. The positional measurement system 10 includes a GPS signal reception robot 100 that is a mobile robot, and an inspection robot 200 that is the object (target) of positional measurement, as illustrated in FIG. 1. The positional measurement system 10 measures the position of the inspection robot 200 using signals (GPS signals) S1 through S4 from multiple GPS satellites GS1 through GS4. GPS is an example of a GNSS. The inspection robot 200 according to the present embodiment is configured to perform inspection (surveying to that end) at locations where the GPS signals S1 through S4 cannot be received, such as inside a tunnel T, for example.

The GPS signal reception robot 100 is, for example, a multicopter type robot capable of freely moving through three-dimensional space, i.e., a so-called drone, as illustrated in FIG. 1. As illustrated in FIG. 2, the GPS signal reception robot 100 has a communication unit 102 that communicates with the inspection robot 200, a position control unit 104 that changes the position, a GPS signal reception unit 106 that receives the GPS signals S1 through S4, a GPS signal precision evaluation unit 108 that evaluates positional measurement precision by the received GPS signals, a communication channel quality evaluation unit 110 that evaluates the quality of the communication channel between the GPS signal reception robot 100 and the inspection robot 200, an evaluation value map creation unit 112 that creates evaluation value maps, and a storage unit 114.

On the other hand, the inspection robot 200 that is the object (target) of positional measurement in the present embodiment is a multicopter type robot capable of freely moving through three-dimensional space, i.e., a so-called drone, in the same way as the GPS signal reception robot 100. As illustrated in FIG. 2, the inspection robot 200 has a communication unit 202 that communicates with the GPS signal reception robot 100, a position control unit 204 that changes the position, a relative position detecting unit 206 that detects the relative position of the inspection robot 200 as to the GPS signal reception robot 100, a position calculation unit 208 that calculates the position of the inspection robot 200, a surveying unit 210 that performs surveying, and a storage unit 212.

The communication unit 102 of the GPS signal reception robot 100 and the communication unit 202 of the inspection robot 200 are configured to communicate wirelessly with each other using radio waves, and are each configured including an antenna and a transceiver, for example. Providing of various types of information D (data) from one to the other of the GPS signal reception robot 100 and inspection robot 200 is performed via these communication units 102 and 202.

The position control unit 104 of the GPS signal reception robot 100 and the position control unit 204 of the inspection robot 200 are for changing the positions of the GPS signal reception robot 100 and the inspection robot 200, i.e., for moving. Both robots 100 and 200 are multicopters in the present embodiment, so the position control units 104 and 204 are each configured including multiple rotors, multiple motors rotationally driving the rotors, and a motor control device that controls the rotations of the motors.

The GPS signal reception unit 106 of the GPS signal reception robot 100 is a GPS signal reception device that receives the GPS signals S1 through S4 from the GPS satellites GS1 through GS4 illustrated in FIG. 1, with the position of the GPS signal reception robot 100 in the GPS coordinates system being calculated based on the received GPS signals. The GPS signal reception unit 106 preferably receives GPS signals from four or more GPS satellites, taking into consideration error between the clocks (atomic clocks) onboard the GPS satellites GS1 through GS4 and the clock onboard the GPS signal reception unit 106.

The GPS signal precision evaluation unit 108 of the GPS signal reception robot 100 evaluates the positional measurement precision by the GPS signals received by the GPS signal reception unit 106. Positional measurement precision by GPS signals is expressed by, for example, the rate of decrease of precision (dilution of precision (DOP)), the number of satellites being received, GPS positional measurement quality (independent positional measurement, differential positional measurement, Real Time Kinematic (RTK) Fix positional measurement, RTK Float positional measurement), or variance values/standard deviate values of positional measurement positions obtained among GPS signals received for a predetermined period. Positional measurement precision by GPS signals may also be expressed by combinations and linear coupling of these.

Values of position DOP (PDOP), horizontal DOP (HDOP), and vertical DOP (VDOP) are used for DOP, with PDOP representing positional precision, and HDOP and VDOP respectively representing the horizontal component and vertical component of PDOP. The positional measurement precision is high if the values of PDOP, HDOP, and VDOP are small, the positional measurement precision is low if the values are high, and can be handled in the same way as standard deviation in probability distribution. The quality of GPS positional measurement s high in the order of RTK Fix positional measurement, RTK Float positional measurement, differential positional measurement, and independent positional measurement. Specific levels of positional measurement precision for each GPS positional measurement quality are dependent on the GPS positional measurement system, and are uniquely decided with regard to each GPS positional measurement system. With regard to variance values/standard deviate values of positional measurement positions obtained among GPS signals received for a predetermined period, variance values are expressed by standard deviate values squared. The greater the value is, the lower the positional measurement precision is, and the smaller the value is, the higher the positional measurement precision is.

The GPS signal precision evaluation unit 108 calculates a precision evaluation value AV as evaluation results of positional measurement precision by GPS signals. The calculated precision evaluation value AV is correlated with the position of the GPS signal reception robot 100 at the time of having received the GPS signals of which the precision was evaluated, and stored in the storage unit 114. Note that high positional measurement precision by GPS signals means that the precision of the position of the GPS signal reception robot 100 calculated by the GPS signal reception unit 106 using these signals is high.

The communication channel quality evaluation unit 110 of the GPS signal reception robot 100 evaluates the quality of the communication channel between the communication unit 102 of the GPS signal reception robot 100 and the communication unit 202 of the inspection robot 200. The quality of the communication channel can be expressed by, for example, the reception strength of radio wave signals received by the communication unit 202 of the inspection robot 200, signal-to-noise ratio, transmission/reception error rate, and so forth. The quality of the communication channel may also be expressed by combinations and linear coupling of these. The greater the reception strength of radio wave signals is, the higher the quality of the communication channel is; the smaller the reception strength, the lower the quality. The greater the signal-to-noise ratio is, the higher the quality of the communication channel is; the smaller the signal-to-noise ratio, the lower the quality. The greater the transmission/reception error rate is, the lower the quality of the communication channel is; the smaller the transmission/reception error rate, the higher the quality.

The communication channel quality evaluation unit 110 calculates a quality evaluation value QV as evaluation results of the quality of the communication channel. The calculated quality evaluation value QV is correlated with the position of the GPS signal reception robot 100 at the time of the quality of the communication channel having been evaluated, and stored in the storage unit 114.

The communication unit 102 of the GPS signal reception robot 100 and the communication unit 202 of the inspection robot 200 exchange information to evaluate the quality of the communication channel. For example, information relating to the strength of signals that the communication unit 202 of the inspection robot 200 has received is transmitted to the communication unit 102 of the GPS signal reception robot 100.

The evaluation value map creation unit 112 of the GPS signal reception robot 100 creates an evaluation value map based on the precision evaluation results by the GPS signal precision evaluation unit 108 and the quality evaluation results by the communication channel quality evaluation unit 110. Specifically, the evaluation value map is a map to assist finding the optimal position for the GPS signal reception robot 100 to measure the position of the inspection robot 200. The evaluation value map includes a fitness evaluation value FV indicating the fitness relating to relaying GNSS signals regarding reception of GPS signals and communication with the target, for each position in a space.

The fitness evaluation value FV is calculated based on the precision evaluation value AV calculated by the GPS signal precision evaluation unit 108 and the quality evaluation value QV calculated by the communication channel quality evaluation unit 110. Specifically, the fitness evaluation value FV of a certain position in a space is calculated from the precision evaluation value AV and quality evaluation value QV at that position.

Figure 3:
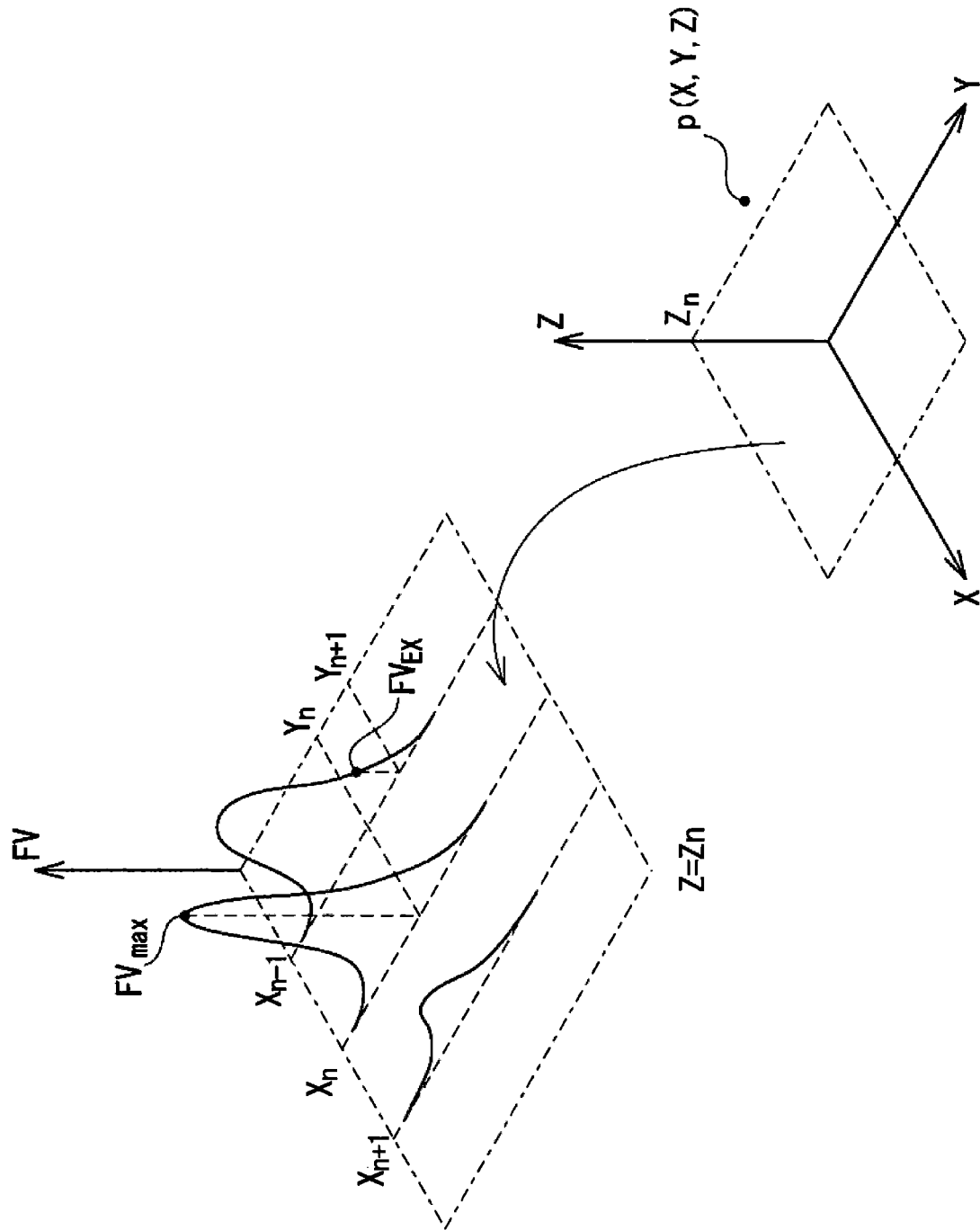
FIG. 3 is a conceptual diagram of an evaluation value map.

FIG. 3 is a conceptual diagram of an evaluation value map. Expressing positions in the space by coordinates (X, Y, Z) in an X-Y-Z coordinates system for example, FIG. 3 indicates a fitness evaluation value FV distribution at $Z=Z_n$. The fitness evaluation value FV according to an example at position $X_{n-1}$, $Y_{n+1}$, $Z_n$) is a function of the precision evaluation value AV and quality evaluation value QV stored in the storage unit 114 in a manner correlated with the position $X_{n-1}$, $Y_{n+1}$, $Z_n$). The fitness evaluation value FV is defined as in Expression 1 for example, $$FV=\alpha \times AV + \beta \times QV \quad \text{Expression (1)}$$

where $\alpha$ and $\beta$ are weighting coefficients.

Normally, coefficient $\alpha$ is set to be larger than coefficient $\beta$, since receiving high-precision GPS signals is most important regarding the fitness evaluation value FV of the position where the GPS signal reception robot 100 is situated. Note that the coefficients $\alpha$ and $\beta$ nay be changed in according with the situation or need. Also, the expression for defining the fitness evaluation value FV that is a function of the precision evaluation value AV and quality evaluation value QV may be an expression other than Expression (1).

Created evaluation value maps is stored in the storage unit 114 of the GPS signal reception robot 100 as data; details of the method of creating an evaluation value map will be described later. Evaluation value maps may also be created by evaluating positional measurement precision by GPS signals at all positions where the GPS signal reception robot 100 could be situated, and also evaluating the communication channel quality. Further, evaluation value maps may be created using a minimum value search algorithm of which gradient methods such as coarse-to-fine search, hill climbing/steepest descent, and so forth, are representative.

Figure 4:
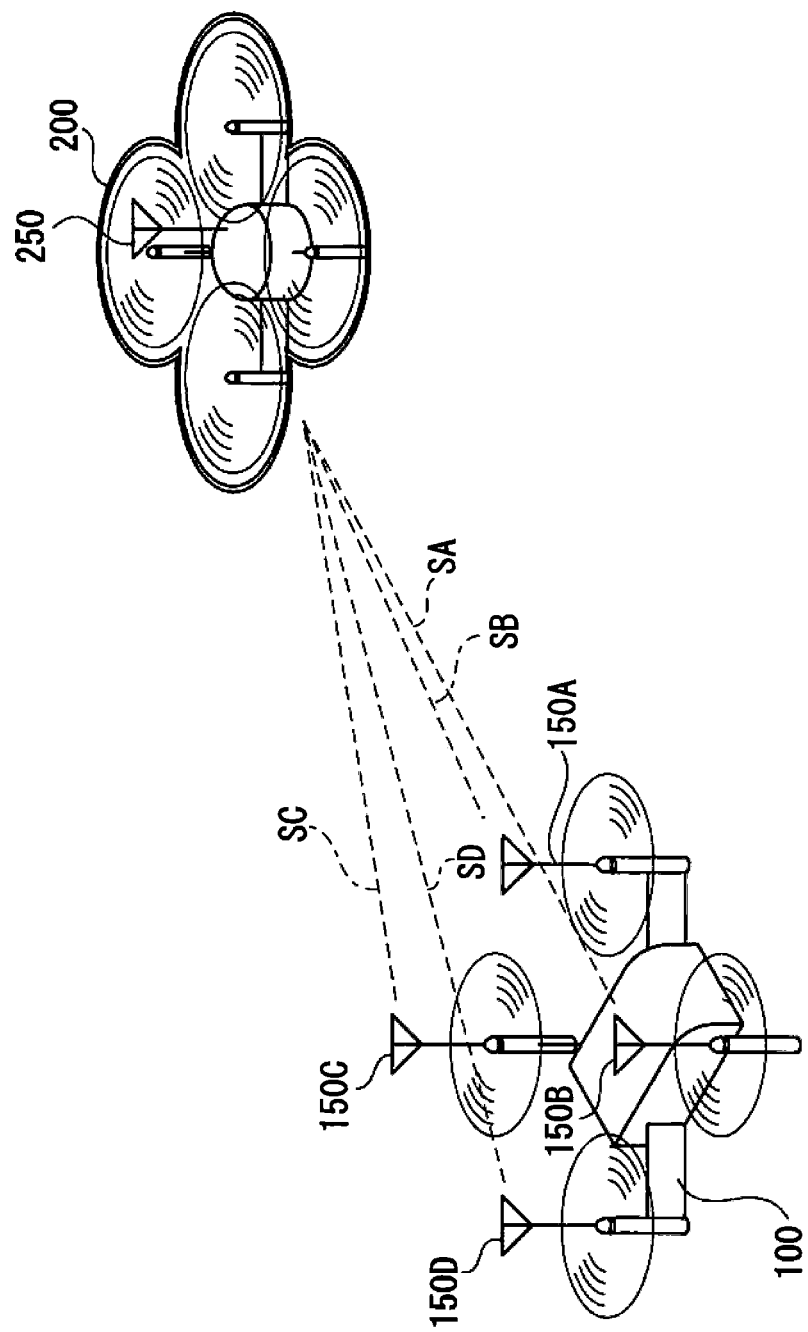
FIG. 4 is a diagram for describing an example of detection of relative position.

Returning to FIG. 2, the relative position detecting unit 206 of the inspection robot 200 is configured to detect the relative position of the inspection robot 200 as to the GPS signal reception robot 100. FIG. 4 illustrates an example of relative position detection of the inspection robot 200 as to the GPS signal reception robot 100.

The GPS signal reception robot 100 has multiple (four) pattern signal output devices 150A through 150D, to output respective different pattern signals SA through SD, as illustrated in FIG. 4, to detect the relative position. Each of the multiple pattern signal output devices 150A through 150D are provided to different positions on the GPS signal reception robot 100. On the other hand, the inspection robot 200 has a pattern signal reception device 250 that receives the pattern signals SA through SD transmitted from the multiple pattern signal output devices 150A through 150D.

The relative position detecting unit 206 calculates the distance to each of the pattern signal output devices 150A through 150D of the GPS signal reception robot 100 from the pattern signal reception device 250, based on the propagation time (the time from transmission to reception) of the pattern signals SA through SD transmitted from the pattern signal output devices 150A through 150D. Based on the calculated distances, the relative position detecting unit 206 detects (calculates) the relative position of the inspection robot 200 as to the GPS signal reception robot 100. That is to say, the relative position detecting unit 206 calculates the relative position using a method the same as with GPS. The relative position detecting unit 206 preferably detects the relative position based on pattern signals transmitted from four or more pattern signal transmission devices, taking into consideration error between the clock onboard the GPS signal reception robot 100 and the clock onboard the inspection robot 200. The detected relative position is stored in the storage unit 212 as data.

The relative position detecting unit 206 according to the present embodiment performs relative position detection of the inspection robot 200 in a case where the GPS signal reception robot 100 is situated at a high-precision reception position where the precision evaluation value AV is higher than a first threshold precision evaluation value $AV_{T1}$, i.e., where high-precision GPS signals can be received, and also is situated at a high-quality communication position where the quality evaluation value QV is higher than a first threshold quality evaluation value $QV_{T1}$ where a high-quality communication channel cab be established with the inspection robot 200. This will be described in detail later.

The position calculation unit 208 of the inspection robot 200 calculates the position of the inspection robot 200, which is the position on the GPS coordinates system in the case of the present embodiment. Accordingly, the position calculation unit 208 acquires information of the position of the GPS signal reception robot 100 calculated by the GPS signal reception unit 106 (position on the GPS coordinates system), and relative position information of the inspection robot 200 as to the GPS signal reception robot 100 that has been detected by the relative position detecting unit 206. Based on the acquired information, the position calculation unit 208 calculates the position of the inspection robot 200 (position on the GPS coordinates system).

The position calculation unit 208 calculates the position of the inspection robot 200 in a case where the GPS signal reception robot 100 is at an aforementioned high-precision reception position and also is at an aforementioned high-quality communication position in the present embodiment. This will be described in detail later.

The surveying unit 210 of the inspection robot 200 is a surveying device such as a laser surveying instrument that surveys the ceiling and side walls of a tunnel T, a camera that photographs the ceiling and side walls, or the like, for example. The surveying unit 210 uses the position of the inspection robot 200 calculated by the position calculation unit 208 to perform surveying. The survey results from the surveying unit 210 are stored in the storage unit 212 as data, or are transmitted to an external device (omitted from illustration) for monitoring of the surveying results.

Description has been made so far regarding the components of the positional measurement system 10, that is to say, the components of the GPS signal reception robot 100 and the inspection robot 200. Description will now be made regarding to an evaluation value map creating method, and a method of calculating the position of the inspection robot 200 using the evaluation value map.

Figure 5:
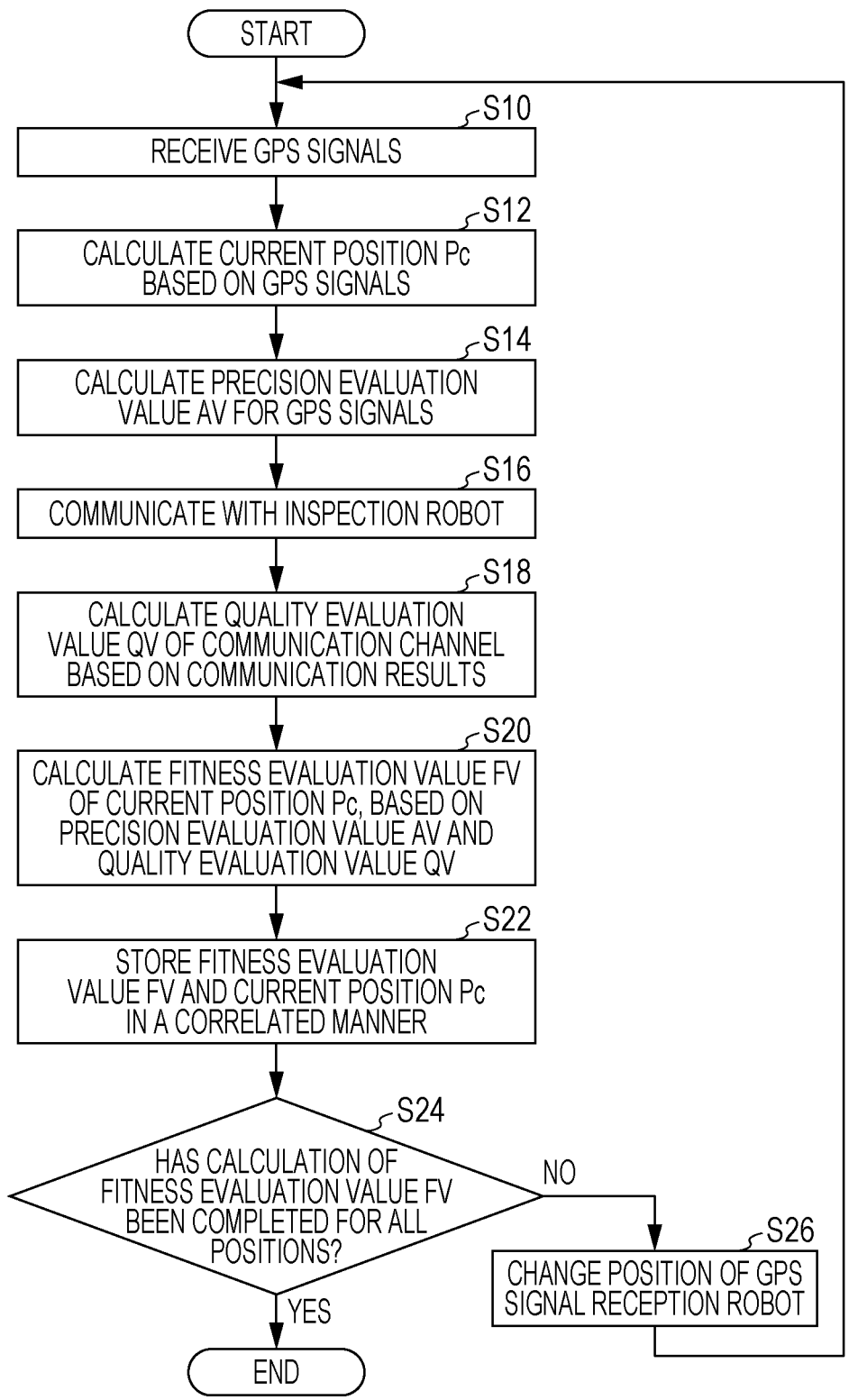
FIG. 5 is a flowchart of creation of an evaluation value map.

FIG. 5 is a flowchart illustrating the flow of an example of evaluation value map creation. As illustrated in FIG. 5, first, the GPS signal reception unit 106 of the GPS signal reception robot 100 receives GPS signals in step S10.

Next, in step S12, the GPS signal reception unit 106 calculates the current position Pc of the GPS signal reception robot 100, based on the GPS signals received in step S10.

The GPS signal precision evaluation unit 108 then in step S14 evaluates the positional measurement precision by the GPS signals received in step S10, and thus calculates the precision evaluation value AV.

The communication unit 102 of the GPS signal reception robot 100 then performs communication with the communication unit 202 of the inspection robot 200 for evaluation of the quality of the communication channel in step S16.

Next, in step S18, the communication channel quality evaluation unit 110 evaluates the quality of the communication channel regarding the communication performed in step S16, and thus calculates the quality evaluation value QV.

In step S20, the evaluation value map creation unit 112 calculates the fitness evaluation value FV for the current position Pc, based on the precision evaluation value AV calculated in step S14 and the quality evaluation value QV calculated in step S18.

The fitness evaluation value FV and positional measurement calculated in step S20 are stored in a correlated manner in the storage unit 114 in step S22.

In step S24, determination is made regarding whether or not calculation of the fitness evaluation value FV has been completed for all positions where the GPS signal reception robot 100 could be situated. In a case where calculation of the fitness evaluation value FV has been completed for all positions, creating of the evaluation value map is ended, and the completed evaluation value map is stored in the storage unit 114.

Note that in a case where the evaluation value map is created using a minimum value search algorithm of which gradient methods such as coarse-to-fine search, hill climbing/steepest descent, and so forth are representative, as described above, determination is made in step S24 regarding whether or not calculation of fitness evaluation value FV has been completed for all positions minimally necessary to create the evaluation value map by gradient method. In an illustrative case where a cube of a certain size that is made up of XYZ axes is divided equally by a certain number of divisions as to each axis, for example, "positions minimally necessary" means all values that intersections of division faces can assume. In azimuthal terms, the X axis is the east-west direction, the Y axis is the north-south direction, and the Z axis is the height direction On the other hand, in a case where calculation of the fitness evaluation value FV has not been completed for all positions, the flow advances to step S26, and the position control unit 104 changes the position of the GPS signal reception robot 100. The flow then returns to step S10, and calculation of the fitness evaluation value FV for the position after changing is executed.

Figure 6A:
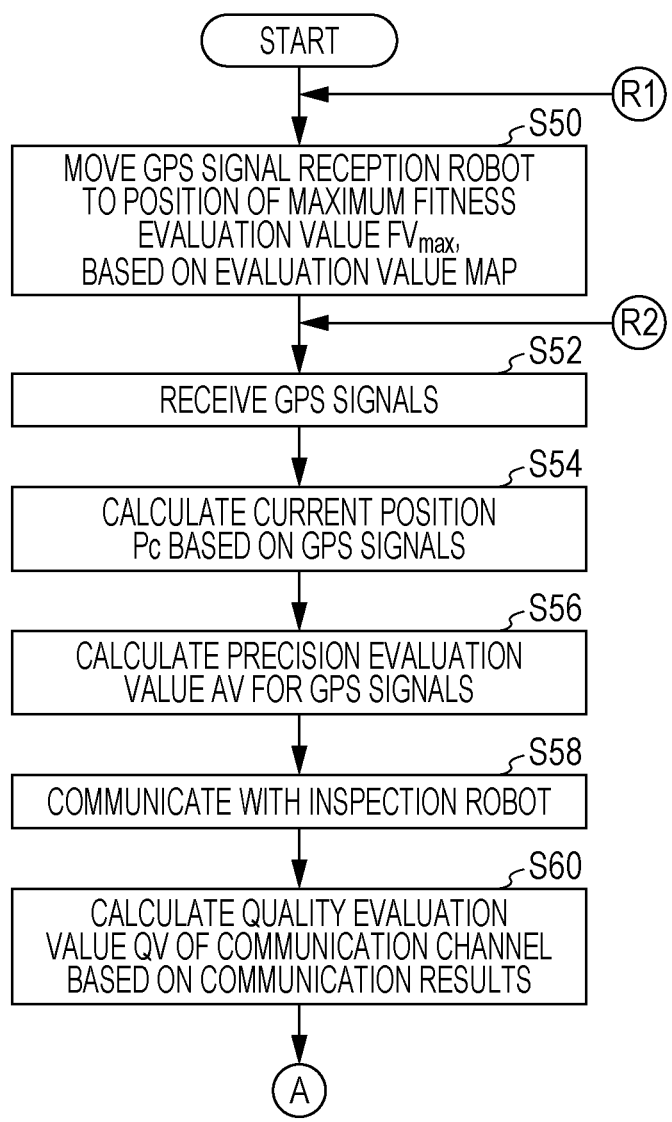
FIG. 6A is a flowchart illustrating part of a flow of positional measurement.
Figure 6B:
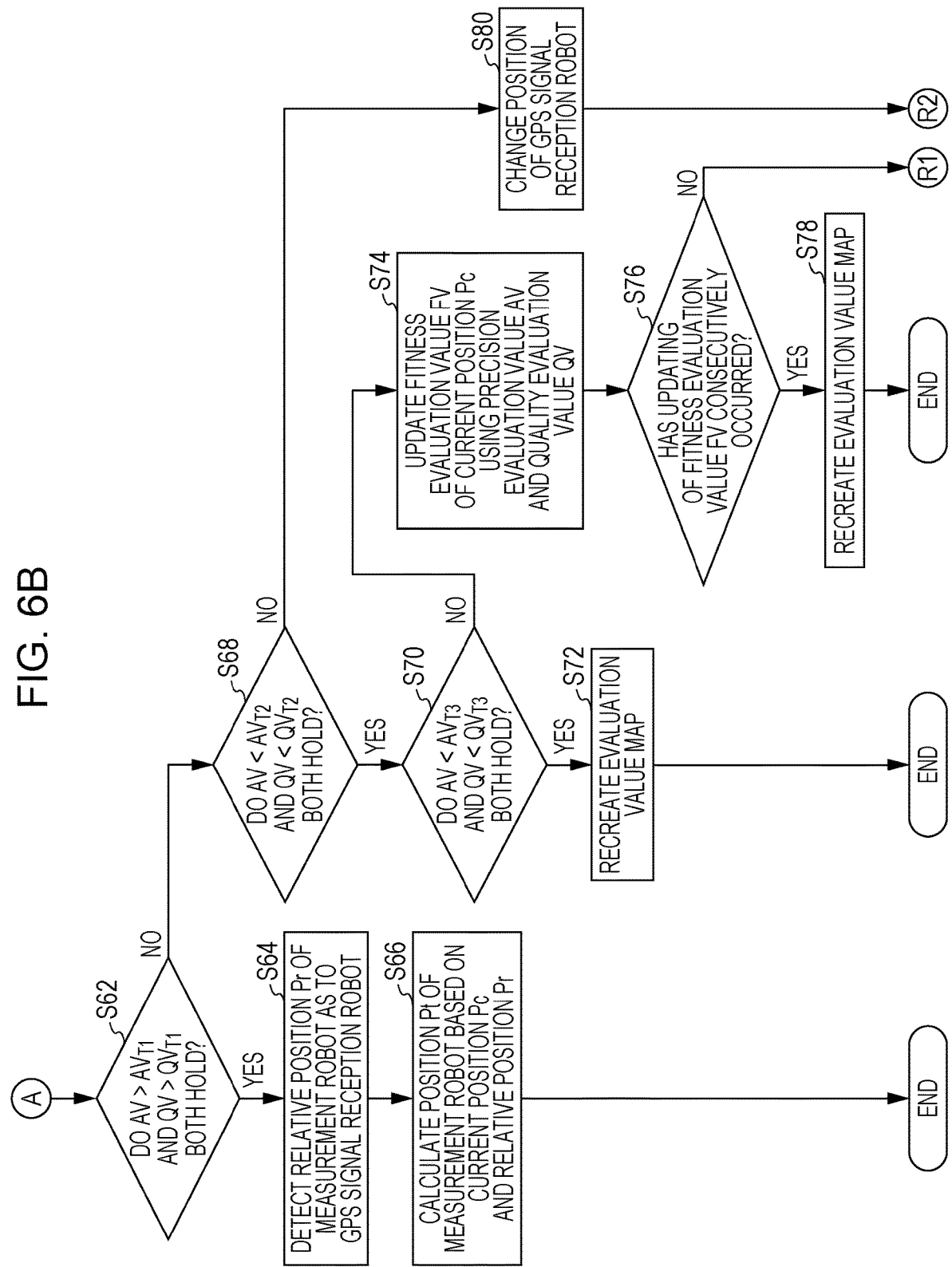
FIG. 6B is a flowchart illustrating the remaining part of the flow of positional measurement.

FIGS. 6A and 6B are flowcharts illustrating the flow of an example of calculating the position to the inspection robot 200 using an evaluation value map. First, in FIG. 6A, the position control unit 104 moves the GPS signal reception robot 100 to the position having the highest fitness evaluation value FV in the evaluation value map in step S50. For example, the GPS signal reception robot 100 at position p (X, Y, Z) in FIG. 3 is moved to the position $(X_n, Y_n, Z_n)$ that has the highest fitness evaluation value $FV_{max}$.

Next, in step S52, the GPS signal reception unit 106 of the GPS signal reception robot 100 that has moved to the highest fitness evaluation value $FV_{max}$ in step S50 receives GPS signals.

The GPS signal reception unit 106 then in step S54 calculates the current position Pc of the GPS signal reception robot 100 based on the GPS signals received in step S52.

In step S56, the GPS signal precision evaluation unit 108 then evaluates the positional measurement precision by the GPS signals received in step S52, thus calculating the precision evaluation value AV.

The communication unit 102 of the GPS signal reception robot 100 and the communication unit 202 of the inspection robot 200 perform communication for evaluation of the quality of the communication channel in step S58.

Next, in step S60, the communication channel quality evaluation unit 110 evaluates the quality of the communication channel from the communication in step S58, thereby calculating the quality evaluation value QV.

In FIG. 6B, determination is made in step S62 regarding whether or not the state is a state where the precision evaluation value AV calculated in step S56 is higher than the first threshold precision evaluation value $AV_{T1}$, and also the quality evaluation value QV calculated in step S60 is higher than the first threshold quality evaluation value $QV_{T1}$ (first state). In a case of the first state the flow advances to step S64. Otherwise, the flow advances to step S68.

This step S62 is a step for reconfirming the position having the highest fitness evaluation value $FV_{max}$ in the evaluation value map. That is to say, this position is a step for confirming that the GPS signal reception robot 100 is situated at a high-precision reception position where GPS signals yielding high positional measurement precision can be received, and also is situated at a high-quality communication position where a high-quality communication channel can be established with the inspection robot 200.

Accordingly, the first threshold precision evaluation value $AV_{T1}$ corresponds to positional measurement precision by GPS signals minimally necessary to receive GPS signals that yield high positional measurement precision, and the first threshold quality evaluation value $QV_{T1}$ is the quality of the communication channel minimally necessary to establish a high-quality communication channel. This communication channel quality affects relative position detection of the inspection robot 200 as to the GPS signal reception robot 100, and transmission of the position (data) of the GPS signal reception robot 100 to the inspection robot 200 that is necessary for position calculation of the inspection robot 200. Accordingly, the first threshold precision evaluation value $AV_{T1}$ and first threshold quality evaluation value $QV_{T1}$ are minimally necessary values for measuring the position of the inspection robot 200 with high precision. Note that the first threshold precision evaluation value $AV_{T1}$ and first threshold quality evaluation value $QV_{T1}$ may be changeable in accordance with the required positional measurement precision of the inspection robot 200 as to the GPS signal reception robot 100.

In a case where determination is made in step S62 that the state is a state where the precision evaluation value AV is higher than the first threshold precision evaluation value $AV_{T1}$, and also the quality evaluation value QV is higher than the first threshold quality evaluation value $QV_{T1}$ (first state), in step S64 the relative position detecting unit 206 of the inspection robot 200 detects the relative position Pr of the inspection robot 200.

Next, the position calculation unit 208 of the inspection robot 200 calculates the position Pt of the inspection robot 200 in step S66, based on the current position Pc of the GPS signal reception robot 100 calculated in step S54 and the relative position Pr calculated in step S64. Thus, the positional measurement of the inspection robot 200 ends.

In a case where determination is made in step S62 that the state is not a state where the precision evaluation value AV calculated in step S56 is higher than the first threshold precision evaluation value $AV_{T1}$, and also the quality evaluation value QV is higher than the first threshold quality evaluation value $QV_{T1}$ (first state), the following determination is made in step S68. Specifically, determination is made regarding whether or not the state is a state where the precision evaluation value AV calculated in step S56 is lower than a second threshold precision evaluation value $AV_{T2}$, and also the quality evaluation value QV calculated in step S60 is lower than a second threshold quality evaluation value $QV_{T2}$ (second state). This second threshold precision evaluation value $AV_{T2}$ is set to a lower value than the first threshold precision evaluation value $AV_{T1}$. Also, the second threshold quality evaluation value $QV_{T2}$ is set to a value lower than the first threshold quality evaluation value $QV_{T1}$. In a case where the state is found to be the second state as a result of determination, the flow advances to step S70. Otherwise, the flow advances to step S80.

In step S70, determination is made regarding whether or not the state is a state where the precision evaluation value AV calculated in step S56 is lower than a third threshold precision evaluation value $AV_{T3}$, and also the quality evaluation value QV calculated in step S60 is lower than a third threshold quality evaluation value $QV_{T3}$. This third threshold precision evaluation value $AV_{T3}$ is set to a lower value than the second threshold precision evaluation value $AV_{T2}$. Also, the third threshold quality evaluation value $QV_{T3}$ is set to a value lower than the second threshold quality evaluation value $QV_{T2}$. In a case where the precision evaluation value AV is lower than the third threshold precision evaluation value $AV_{T3}$, and also the quality evaluation value QV is lower than the third threshold quality evaluation value $QV_{T3}$, the flow advances to step S72. Otherwise, the flow advances to step S74.

In step S72, the evaluation value map is recreated. This is because despite the position being at the highest fitness evaluation value $FV_{max}$ in the evaluation value map, the precision evaluation value AV and quality evaluation value QV calculated at this position are low. In other words, the evaluation value map that was used does not match the current state. Accordingly, a newest evaluation value map that matches the newest state is recreated following the flow illustrated in FIG. 5.

In step S74, the evaluation value map creation unit 112 updates the fitness evaluation value FV of the current position Pc in the evaluation value map, using the precision evaluation value AV calculated in step S56 and the quality evaluation value QV calculated in step S60. That is to say, the current position Pc having the highest fitness evaluation value $FV_{max}$ is updated to a position that is not fit for positional measurement of the inspection robot 200. Accordingly, the evaluation value map is updated in accordance with the newest state.

In step S76 following step S74, determination is made regarding whether or not updating of the fitness evaluation value FV in the evaluation value map has occurred twice consecutively, for example. In a case where updating has consecutively occurred, the flow advances to step S78, and recreation of the evaluation value map is performed in the same way as in step S72. Otherwise, the flow returns to step S50 in FIG. 6A to measure the position Pt of the inspection robot 200.

In a case where determination is made in step S68 that the state is not a state where the precision evaluation value AV is lower than the second threshold precision evaluation value $AV_{T2}$, and also the quality evaluation value QV is lower than the second threshold quality evaluation value $QV_{T2}$ (second state), the position control unit 104 changes the position of the GPS signal reception robot 100 in step S80. At this time, the position of the GPS signal reception robot 100 is changed to a position where, out of the multiple positions adjacent to the current position Pc, the fitness evaluation value FV is the highest. The flow then returns to step S52 in FIG. 6A.

According to the first embodiment described above, the position of an inspection robot at a location shielded from GPS signals or at a location where reception strength of GPS signals is weak can be measured with stable precision, using GPS signals.

Second Embodiment

The difference between a second embodiment and the above-described first embodiment is the point that a relay robot exists between the mobile robot and the inspection robot. Accordingly, the positional measurement system according to the second embodiment will be described primarily regarding the points of different.

Figure 8:
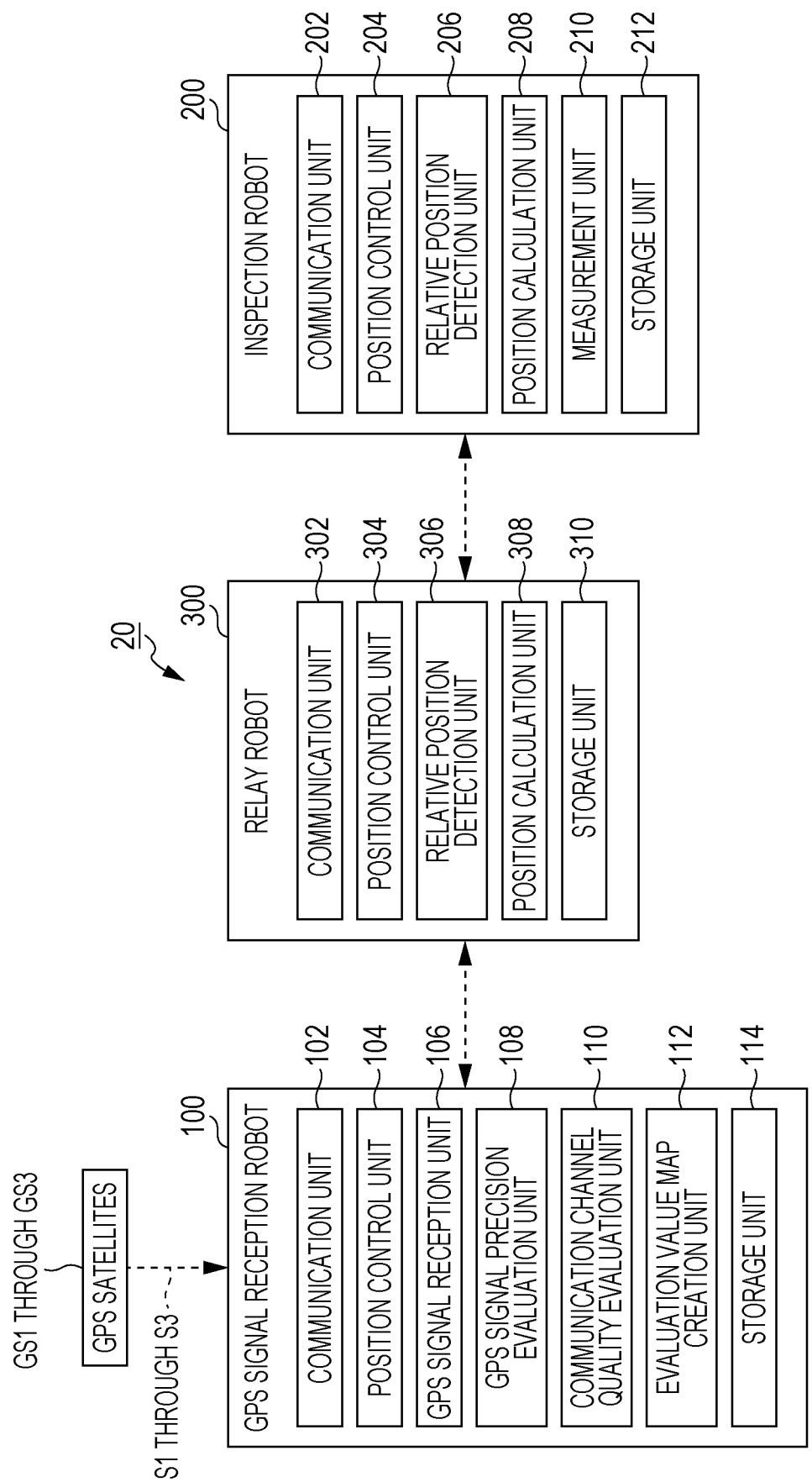
FIG. 8 is a block diagram illustrating the configuration of the positional measurement system according to the second embodiment.

FIG. 7 schematically illustrates the positional measurement system according to the second embodiment. FIG. 8 is a block diagram illustrating the configuration of the positional measurement system. As illustrated in FIG. 7, the positional measurement system according to the second embodiment has the GPS signal reception robot 100, the inspection robot 200, and a relay robot 300. Components which are substantially the same as the components of the above-described first embodiment are denoted with the same reference numerals, and description thereof will be omitted.

The relay robot 300 is used in a case where there is a great distance between the GPS signal reception robot 100 and the inspection robot 200. That is to say, the relay robot 300 is used in a case where the GPS signal reception robot 100 and the inspection robot 200 are so far away that the relative position of the inspection robot 200 as to the GPS signal reception robot 100 cannot be detected with the requested precision, or in a case where a communication channel cannot be established between the GPS signal reception robot 100 and the inspection robot 200. For example, the relay robot 300 is used in a case where the inspection robot 200 performs inspection at a deep position of the tunnel T, that is far away from the entrance of the tunnel T where the GPS signal reception robot 100 is situated.

The relay robot 300 has a communication unit 302 that communicates with the communication unit 102 of the GPS signal reception robot 100 and the communication unit 202 of the inspection robot 200, and a position control unit 304 that changes the position of the relay robot 300. In the second embodiment, the relay robot 300 is a multicopter type robot capable of freely moving through three-dimensional space, i.e., a so-called drone, in the same way as the GPS signal reception robot 100 and the inspection robot 200.

In short, the positional measurement system 20 according to the second embodiment that uses the relay robot 300 measures the position of the inspection robot 200 as follows. First, the relative position of the relay robot 300 as to the GPS signal reception robot 100 is detected. The relay robot 300 has a relative position detection unit 306 to this end. The relative position detection unit 306 detects the relative position of the relay robot 300 as to the GPS signal reception robot 100, by the same method as the method that the relative position detecting unit 206 according to the first embodiment described above detects the relative position of the inspection robot 200 as to the GPS signal reception robot 100. Next, a position calculation unit 308 of the relay robot 300 calculates the position of the relay robot 300 based on the position of the GPS signal reception robot 100 and the relative position detected by the relative position detection unit 306. The communication unit 302 of the relay robot 300 receives position (data) of the GPS signal reception robot 100 from the communication unit 102 of the GPS signal reception robot 100 for this. The calculated position of the relay robot 300 is stored in a storage unit 310. Thus, the relay robot 300 also serves as a target of which the position is measured using GPS signals, in the same way as the inspection robot 200 in the above-described first embodiment.

Upon the position of the relay robot 300 being calculated, the relative position detecting unit 206 of the inspection robot 200 detects the relative position of the inspection robot 200 as to the relay robot 300. The inspection robot 200 also receives the position (data) of the relay robot 300, from the communication unit 302 of the relay robot 300. The position calculation unit 208 calculates the position of the inspection robot 200 based on the position of the relay robot 300 that has been detected and the relative position that has been detected by the relative position detecting unit 206.

By going through the relay robot 300 in this way, the position of the inspection robot can be measured with stable precision using GPS signals, even in a case where the GPS signal reception robot 100 and inspection robot 200 are far away from each other.

Note that multiple relay robots 300 may be used. For example, multiple relay robots 300 may be serially arrayed between the GPS signal reception robot 100 and the inspection robot 200. A relay robot 300 closer to the inspection robot 200 detects the relative position of a relay robot 300 closer to the GPS signal reception robot 100 side. The respective positions of the relay robots 300 are then calculated based on the relative position. As a result, the position of the inspection robot 200 can be calculated using the position of the GPS signal reception robot 100 calculated based on GPS signals.

Further, multiple (at least three) relay robots 300 may be arrayed in parallel as to the inspection robot 200. In this case, first, the relative positions of each of the relay robots 300 as to the GPS signal reception robot 100 are detected, and the positions of the respective relay robots 300 are calculated based on the relative positions. Next, the distances between the inspection robot 200 and each of the relay robots 300 of which the positions have been calculated are measured, and the relative positions of the inspection robot 200 as to the relay robots 300 are detected based on these distances. As a result, the position of the inspection robot 200 can be calculated using the position of the GPS signal reception robot 100 calculated based on the GPS signals.

Moreover, arrangements of relaying between the GPS signal reception robot 100 and inspection robot 200 are not restricted to the mobile relay robot 300. For example, a stationary relation station, of which the position is fixed, may be substituted for the relay robot 300.

Third Embodiment

The first and second embodiments described above assume that the inspection robot is used at a location where GPS signals cannot be received, i.e., that the position of the inspection robot at a at a location shielded from GPS signals or at a location where reception strength of GPS signals is weak is calculated based on the position of the GPS signal reception robot that can receive GPS signals. However, situations where the inspection robot is used at locations where GPS signals can be received can also be assumed. A third embodiment deals with this assumption.

Figure 9:
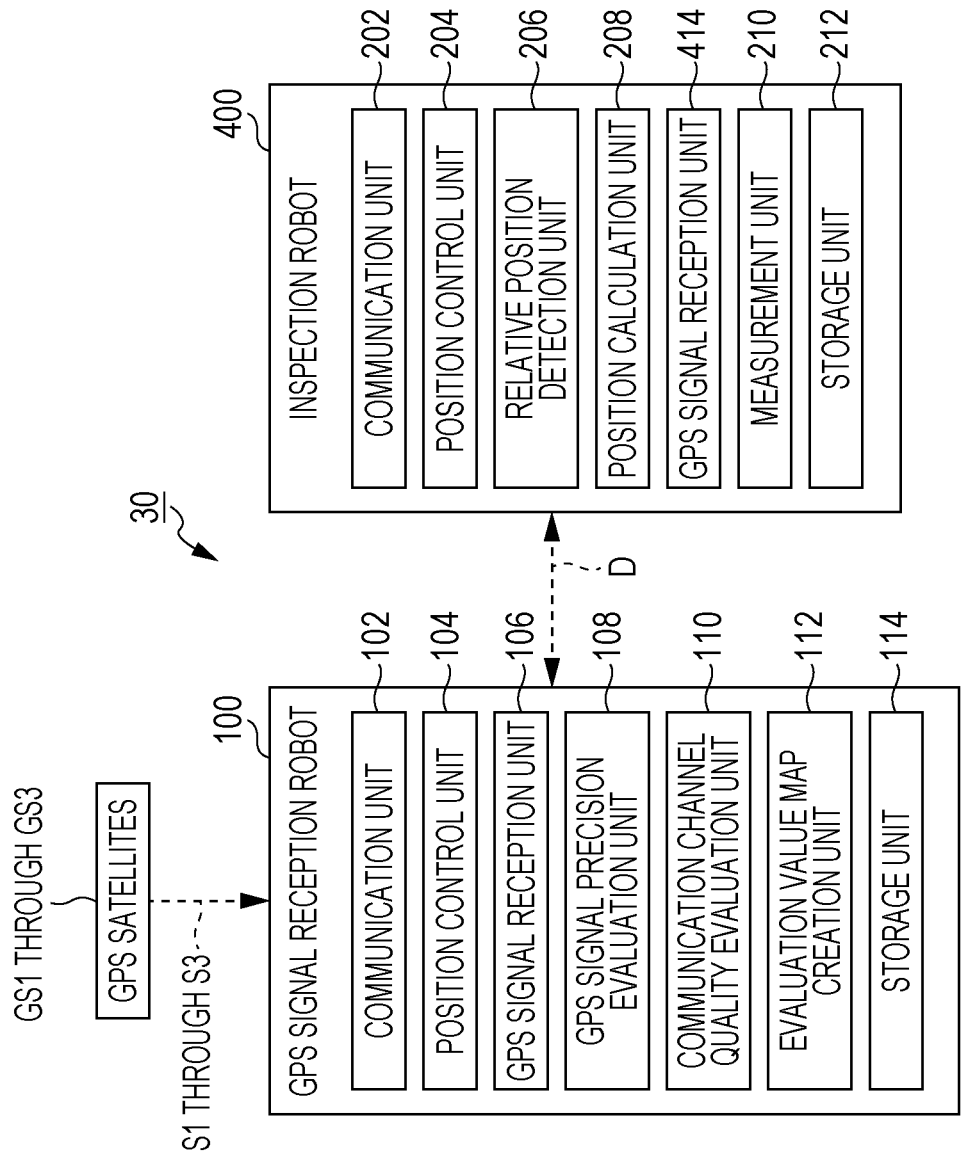
FIG. 9 is a block diagram illustrating the configuration of a positional measurement system according to a third embodiment.

FIG. 9 is a block diagram illustrating the configuration of a positional measurement system according to the third embodiment. Components which are substantially the same as the components of the above-described first embodiment are denoted with the same reference numerals, and description thereof will be omitted.

As illustrated in FIG. 9, an inspection robot 400 of a positional measurement system 30 has a GPS signal reception unit 414 that receives GPS signals and calculates the position of the inspection robot 400 in the same way as the GPS signal reception unit 106 of the GPS signal reception robot 100. Accordingly, a position calculated by the position calculation unit 208 (calculated based on the position of the GPS signal reception robot 100 and the relative position of the inspection robot 400 as to the GPS signal reception robot 100) in a case where GPS signals cannot be received, is used in inspection (surveying) by the inspection robot 400. On the other hand, when GPS signals can be received, the position of the inspection robot 400 calculated by the GPS signal reception unit 414 is used in inspection (surveying) by the inspection robot 400.

The third embodiment enables the position of an inspection robot to be measured with stable precision, using GPS signals in the same way as the above-described first and second embodiments. In a case of using the inspection robot in a location where GPS signals can be received, usage of the GPS signal reception robot can be suppressed. Accordingly, the battery consumption of the GPS signal reception robot can be suppressed, and maintenance can be performed on the GPS signal reception robot, for example.

Fourth Embodiment

A fourth embodiment is an improvement embodiment of the above-described third embodiment. In the case of the above-described third embodiment, one or the other of a position calculated by the position calculation unit 208 and a position calculated by the GPS signal reception unit 414 is used for inspection (surveying) by the inspection robot 400. On the other hand, in the fourth embodiment, the inspection robot performs inspection (surveying) taking into consideration both a position calculated by a position calculation unit and a position calculated by a GPS signal reception unit.

Figure 10:
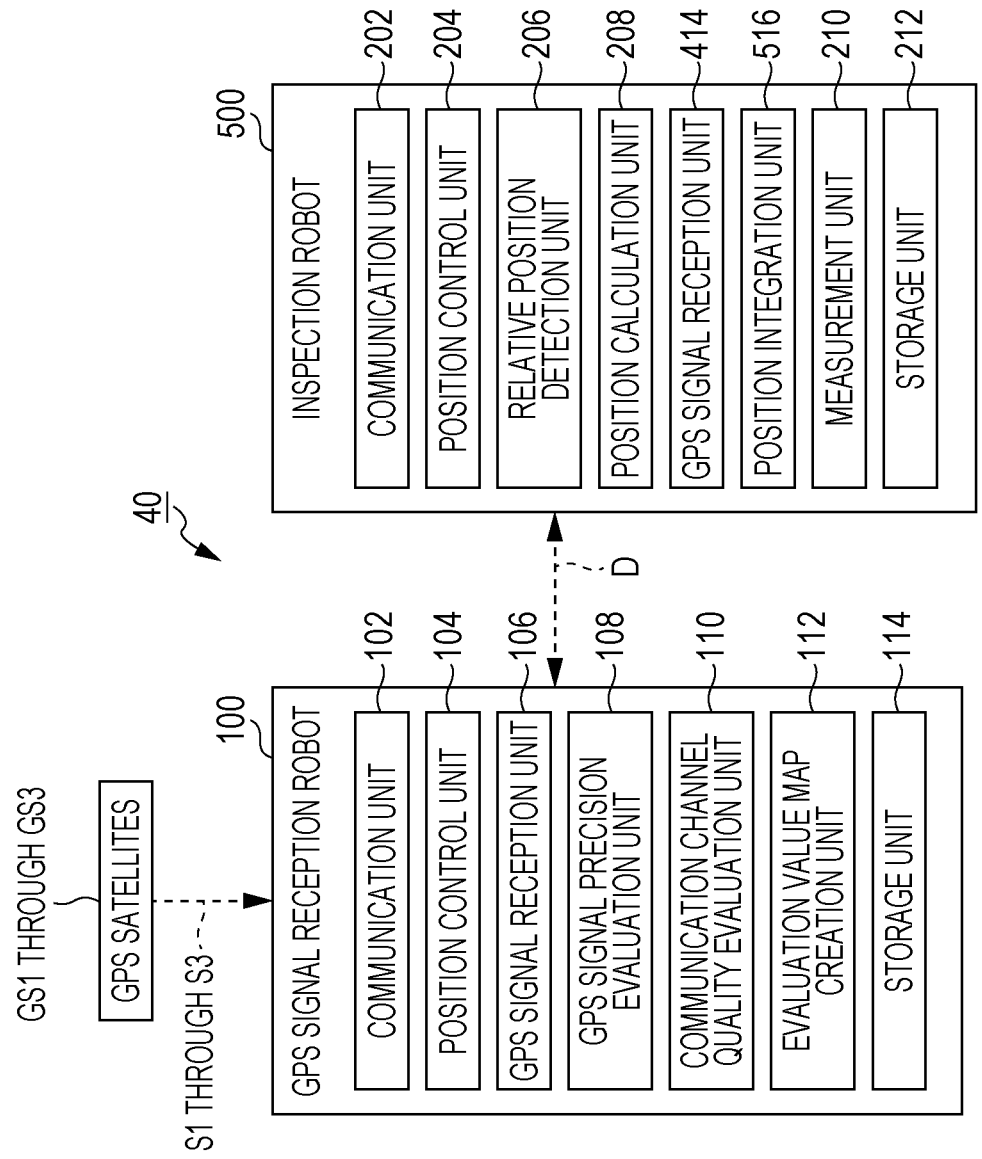
FIG. 10 is a block diagram illustrating the configuration of a positional measurement system according to a fourth embodiment.

FIG. 10 is a block diagram illustrating the configuration of a positional measurement system according to the fourth embodiment. Components which are substantially the same as the components of the above-described first through third embodiments are denoted with the same reference numerals, and description thereof will be omitted.

As illustrated in FIG. 10, an inspection robot 500 of a positional measurement system 40 has a position integration unit 516 that integrates the position calculated by the position calculation unit 208 and the position calculated by the GPS signal reception unit 414, to calculate a position used for surveying. The position integration unit 516 calculates the average position of the position calculated by the position calculation unit 208 and the position calculated by the GPS signal reception unit 414, for example. The position integration unit 516 also weights the position P1 calculated by the position calculation unit 208 and the position P2 calculated by the GPS signal reception unit 414 with weights that differ from each other, and calculates the position, as illustrated in the following Expression (2)

$$P = \gamma \times P1 + (1-\gamma)P2 \qquad \text{Expression (2)}$$

where $\gamma$ is a number smaller than 1.

Using the position integrated by this position integration unit 516 gives the results of surveying higher reliability than a case where just one of the position calculated by the position calculation unit 208 and the position calculated by the GPS signal reception unit 414 is used. That is to say, the position after integration has higher reliability than each of the positions before integration. For example, in a case where the GPS signal reception unit 414 of the inspection robot 500 does not directly receive GPS signals from the GPS satellite and receives GPS signals reflected off of the ground or the like, and uses just the position of the inspection robot 500 calculated by the GPS signal reception unit 414 for surveying, the reliability of the surveying results will be lower. The fourth embodiment also enables the position of an inspection robot to be measured with stable precision, using GPS signals, in the same way as the first through third embodiments above.

Fifth Embodiment

A fifth embodiment is an improvement embodiment of the above-described third embodiment. In the case of the third embodiment described above, one or the other of the position calculated by the position calculation unit 208 and the position calculated by the GPS signal reception unit 414 is used for inspection (surveying) by the inspection robot 400. Specifically, in a case where the GPS signal reception unit 414 of the inspection robot 400 is capable of receiving GPS signals, a position calculated thereby is used, and otherwise, a position calculated by the position calculation unit 208 is used. On the other hand, in the case of a fifth embodiment, one or the other of the position calculated by the position calculation unit 208 and the position calculated by the GPS signal reception unit 414 is selected, and the selected position is used for inspection (surveying) by an inspection robot 600.

Figure 11:
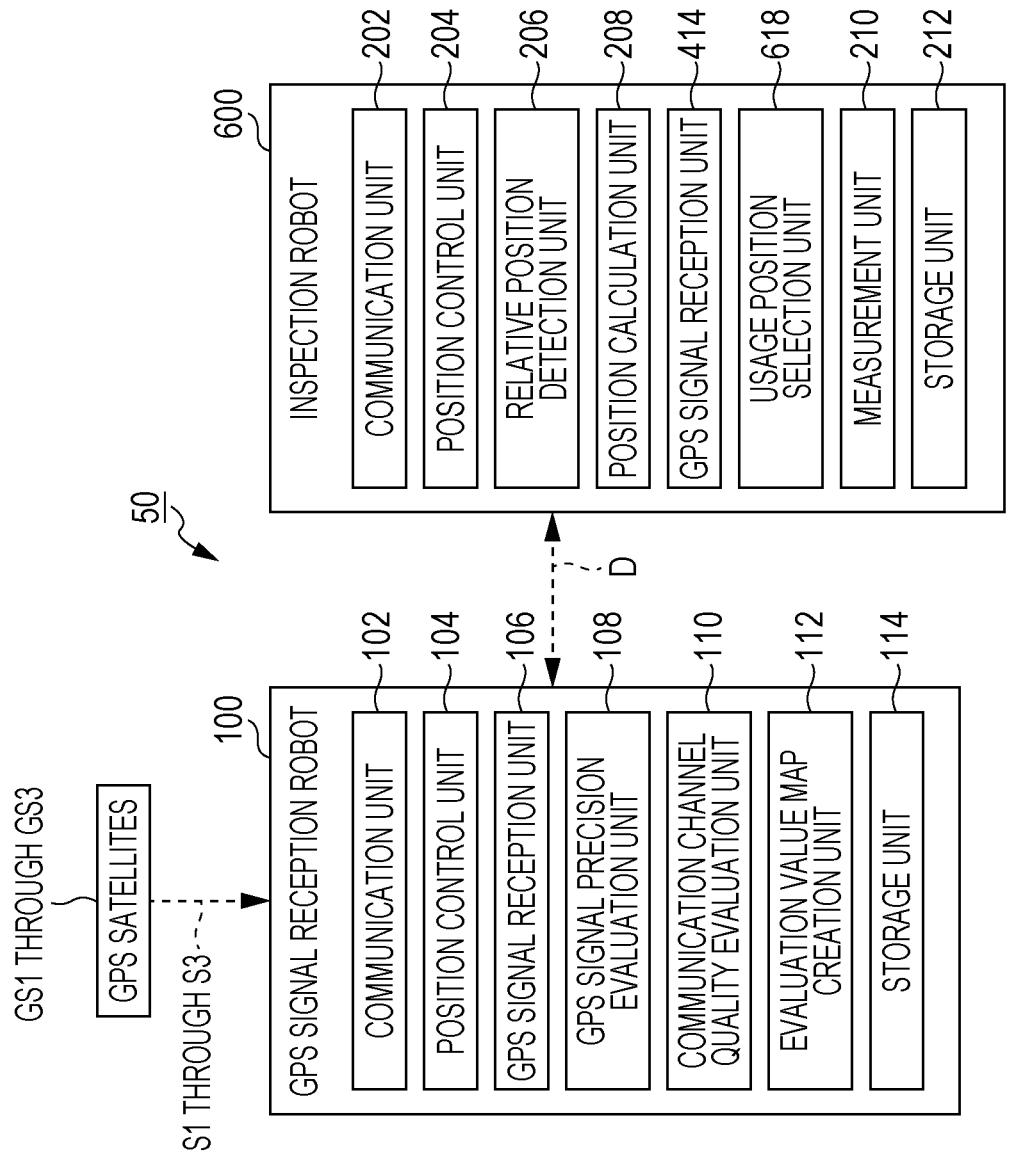
FIG. 11 is a block diagram illustrating the configuration of a positional measurement system according to a fifth embodiment.

FIG. 11 is a block diagram illustrating the configuration of the positional measurement system according to the fifth embodiment. Components which are substantially the same as the components of the above-described first through fourth embodiments are denoted with the same reference numerals, and description thereof will be omitted.

The inspection robot 600 has a usage position selection unit 618 to select one of the position calculated by the position calculation unit 208 and the position calculated by the GPS signal reception unit 414. The usage position selection unit 618 selects one of the position calculated by the position calculation unit 208 and the position calculated by the GPS signal reception unit 414 based on a selection profile defined by the user beforehand, for example, i.e., selects in accordance with user intent.

Again, for example, the usage position selection unit 618 compares the positional measurement precision by GPS signals that the GPS signal reception unit 106 onboard the GPS signal reception robot 100 has received and the positional measurement precision by the GPS signals that the GPS signal reception unit 414 onboard the inspection robot 600 has received. In a case where the positional measurement precision by the former GPS signals is higher than the positional measurement precision by the latter GPS signals, the position of the inspection robot 600 calculated by the position calculation unit 208 based on the former GPS signals is selected. On the other hand, in a case where the positional measurement precision by the latter GPS signals is higher, the position of this inspection robot 600 calculated by the GPS signal reception unit 414 onboard the inspection robot 600 is selected. The fifth embodiment also enables the position of an inspection robot to be measured with stable precision, using GPS signals, in the same way as the first through fourth embodiments above.

Sixth Embodiment

A sixth embodiment is an improvement embodiment of the above-described first through fifth embodiments. In the case of the above-described first through fifth embodiments, the GPS signal reception robot 100 is disposed at a position where high-precision GPS signals can be received (high-precision reception position) and also where a high-quality communication channel can be established with the inspection robot 200 through 600. The GPS signal reception robot 100 receives the GPS signals at that position, and measures (calculates) the position of the inspection robot 200 through 600 based on the received GPS signals.

However, in the case of the above-described first through fifth embodiments, the GPS signal reception robot 100 is a multicopter type robot capable of freely moving through three-dimensional space so it is difficult to stay at a constant position if there are effects of wind or the like. Accordingly, the GPS signal reception robot 100 according to the sixth embodiment is configured to be able to stay at a constant position.

Figure 12:
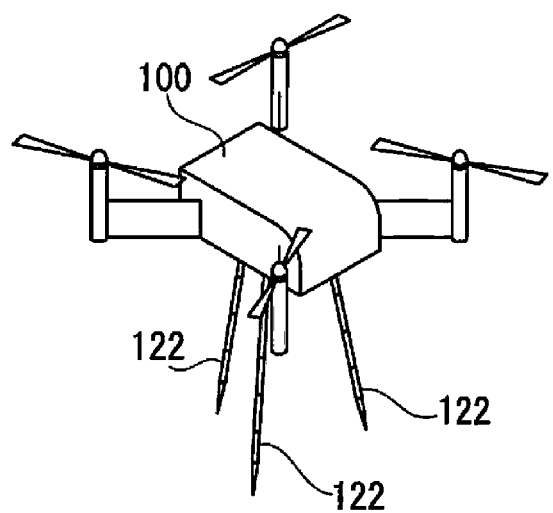
FIG. 12 is a schematic perspective view of a GPS signal reception robot according to a sixth embodiment, having a fixing unit for fixing the position.

FIG. 12 is a schematic perspective view of a GPS signal reception robot 100 according to the sixth embodiment. As illustrated in FIG. 12, the GPS signal reception robot 100 according to the sixth embodiment has a tripod 122 as a fixing unit to fix the position thereof. Each of the legs of the tripod 122 has a tip capable of piercing the ground or the like. This tripod 122 enables the GPS signal reception robot 100 to be fixed at a position where high-precision GPS signals can be received (high-precision reception position) and also where a high-quality communication channel can be established with the inspection robot (high-quality communication position). As a result, the position of the inspection robot can be measured (calculated) with high precision, based on the GPS signals received by the GPS signal reception unit 106 of the fixed GPS signal reception robot 100.

While embodiments of the present disclosure have been described by way of the above first through sixth embodiments, embodiments of the present disclosure are not restricted to these. For example, in the case of the above-described first embodiment, the position of the inspection robot 200 is described as being measured (calculated) based on GPS signals from GPS satellites, which is an example of GNSS, but this is not restrictive. The position of the inspection robot 200 may be calculated based on signals from Global Navigation Satellite System (GLONASS) satellites, which is another example of GNSS. Alternatively, the position of the inspection robot 200 may be measured based on signals from satellites of multiple Navigation Satellite Systems (NSS) included in GNSS. The more satellites, the more the measurement precision of the inspection robot 200 based on the signals therefrom improves.

In the case of the above-described first embodiment, the GPS signal reception robot 100 has been described as being a multicopter type mobile robot capable of freely moving through three-dimensional space, but this is not restrictive. For example, the GPS signal reception robot may be a vehicle-type mobile robot having multiple wheels that turn on the ground for example, so as to be capable of moving over a plane such as the ground or the like. Alternatively, the GPS signal reception robot may be a mobile robot that linearly moves over rails, for example. In short, it is sufficient for the GPS signal reception robot to be a mobile robot that can move to a position where GPS signals can be received with high precision.

In the case of the above-described first embodiment, the positional measurement object (target) has been described as being a multicopter type mobile robot capable of freely moving through three-dimensional space, but this is not restrictive. For example, the target may be a vehicle-type inspection robot having multiple wheels that turn on the ground for example, so as to be capable of moving over a plane such as the ground or the like. Alternatively, the target may be an inspection robot that linearly moves over rails, for example. Further, the target may be a stationary inspection station that does not move, for example.

Further, in the case of the above-described first embodiment, the position of the GPS signal reception robot 100 has been described as being controlled based on the evaluation value map created by the evaluation value map creation unit 112. Accordingly, the GPS signal reception robot 100 can be speedily disposed at a position that is a high-precision reception position where high-precision GPS signals can be received and also is a high-quality communication position where a high-quality communication channel can be established with the inspection robot 200. This evaluation value map may have been created by a separate GPS signal reception robot 100 beforehand.

Further, in the case of the above-described first embodiment, the relative position of the inspection robot 200 as to the GPS signal reception robot 100 has been described as being detected using multiple pattern signal output devices 150A through 150D provided to the GPS signal reception robot 100, and the pattern signal reception device 250 that receives the pattern signals SA through SD output therefrom that is provided to the inspection robot 200, with the relative position detecting unit 206 that ultimately detects (calculates) the relative position being provided to the inspection robot 200. The embodiment of the present disclosure is not restricted to this arrangement.

For example, the relative position of the inspection robot as to the GPS signal reception robot can be detected using a stereo camera device or a laser scanning device. In this case, the stereo camera device or laser scanning device is placed onboard one or the other of the GPS signal reception robot and inspection robot as the relative position detecting unit. That is to say, which of the GPS signal reception robot and inspection robot that the relative position detecting unit is onboard is irrelevant in the embodiments of the present disclosure.

In this regard, in the case of the above-described first embodiment, the position calculation unit 208 that is provided to the inspection robot 200 and calculates the position of this inspection robot 200 may be provided to the GPS signal reception robot 100 instead, as illustrated in FIG. 2. As described earlier, the position calculation unit 208 calculates the position of the inspection robot 200 based on the position of the GPS signal reception robot 100 calculated by the GPS signal reception unit 106 of this GPS signal reception robot 100 and the relative position detected by the relative position detecting unit 206. Accordingly, in a case where a stereo camera device or a laser scanning device or the like is provided to the GPS signal reception robot 100 as the relative position detecting unit 206, also providing the position calculation unit 208 of the inspection robot 200 to the GPS signal reception robot 100 will enable all computation processes necessary for calculating the position of the inspection robot 200 to be performed at the GPS signal reception robot 100 side. This does away with the need to have a computing devices such as a central processing unit (CPU) or the like for computation processing onboard the inspection robot 200. The position (data) of the inspection robot 200 calculated at the GPS signal reception robot 100 side is transmitted to the inspection robot 200 via the communication unit.

Note that in a case where the position calculation unit 208 of the inspection robot 200 is provided to the GPS signal reception robot 100, and the inspection robot 200 needs information of its own position, the position (data) of the inspection robot 200 calculated by the position calculation unit 208 is provided from the GPS signal reception robot 100 to the inspection robot 200. However, the target according to the embodiments of the present disclosure does not have to be a target that needs information of its own position like an inspection robot. For example, the target may be a person, with a laser scanning device onboard the GPS signal reception robot as a relative position detecting unit detecting the relative position of the person, and the position of the person being calculated based on the detected relative position and the position of the GPS signal reception robot. The calculated position of the person is used for monitoring or observation of the person. In this case, communication between the GPS signal reception robot and the person is unnecessary, so the communication units and communication channel quality evaluation unit can be omitted. With regard to the communication channel quality evaluation unit, in a case where the communication channel is stable at a constant quality, such as in a case where the communication channel is a cabled communication channel, the communication channel quality evaluation unit can be omitted.

In light of the above, the positional measurement system according to the embodiments of the present disclosure is a positional measurement system including: a mobile robot including a global navigation satellite system (GNSS) signal reception unit that receives GNSS signals and calculates a position of the mobile robot based on the GNSS signals, a GNSS signal precision evaluation unit that evaluates positional measurement precision by the received GNSS signals, and a position control unit that moves the mobile robot to a high-precision reception position, where GNSS signals yielding positional measurement precision higher than a first threshold precision can be received; a relative position detection unit that detects a relative position of a target as to the mobile robot situated at the high-precision reception position; and a target position calculation unit that calculates a position of the target based on the calculated position of the mobile robot based on the GNSS signals received at the high-precision reception position, and the relative position.

Further, the GPS signal precision evaluation unit 108, communication channel quality evaluation unit 110, evaluation value map creation unit 112, position calculation unit 208, position integration unit 516, and usage position selection unit 618 in the positional measurement system according to the first through sixth embodiments described above can be realized in various forms, and may be realized in various forms. For example, the processing executed by the components may be carried out using a computing device such as a CPU, a program causing the CPU to perform the processing thereof, and a storage device such as read-only memory (ROM) or random access memory (RAM) or the like storing the program. That is to say, the components are configured of a computing device, program, and storage device. Note that the storage device may be the storage units 114 and 212.

Further, any of the above-described first through sixth embodiments may be combined to form a new embodiment.

Several embodiments have been described above as exemplary illustrations of technology according to the present disclosure. The attached drawings and detailed description have thus been provided. Accordingly, not only components essential to carry out the present disclosure, but also components not essential to carry out the present disclosure may be included in the components described in the attached drawings and detailed description to show exemplary illustrations of the technology. The presence of such non-essential components in the attached drawings and detailed description should not be found to imply that the non-essential components are essential.

Moreover, the above-described embodiments are for exemplarily illustrating the technology of the present disclosure, and accordingly various modification, substitutions, additions, omissions, and so forth may be made without departing from the Claims or an equivalent scope.

What is claimed is:

1. A positional measurement system, comprising:
    a mobile robot; and
    an inspection robot,
    wherein the mobile robot includes
        a global navigation satellite system (GNSS) signal reception unit that receives GNSS signals and calculates a position of the mobile robot based on the received GNSS signals,
        a GNSS signal precision evaluation unit that evaluates positional measurement precision of the received GNSS signals, by calculating a precision evaluation value representing the positional measurement precision of the received GNSS signals and determining whether the calculated precision evaluation value is higher than a first threshold precision value,
        a first communication unit that communicates with the inspection robot,
        a communication channel quality evaluation unit that evaluates the quality of a communication channel between the mobile robot and the inspection robot by calculating a quality evaluation value representing the quality of the communication channel and determining whether the calculated quality evaluation value is higher than a first threshold quality value,
        a position control unit that moves the mobile robot to a reception position, where GNSS signals yielding a precision evaluation value higher than the first threshold precision value can be received and where a communication channel yielding a quality evaluation value higher than the first threshold quality value can be established, and
        four or more pattern signal output devices that output four or more pattern signals which are different from each other, wherein the four or more pattern signal output devices are provided to different positions on the mobile robot,
    wherein, when the mobile robot is positioned at the reception position, the GNSS signal reception unit receives new GNSS signals and calculates a new position of the mobile robot based on the received new GNSS signals,
    wherein, when the mobile robot is positioned at the reception position, the four or more pattern signal output devices output the four or more pattern signals, and
    wherein the inspection robot includes
        a pattern signal reception device that receives the four or more pattern signals output from the four or more pattern signal output devices of the mobile robot positioned at the reception position,
        a relative position detection unit
            that calculates four or more distances from the pattern signal reception device to the four or more pattern signal output devices of the mobile robot at the reception position based on the received four or more pattern signals, and
            that detects a relative position of the inspection robot with respect to the mobile robot positioned at the reception position based on the calculated four or more distances, and
        a position calculation unit that calculates a position of the inspection robot based on the calculated new position of the mobile robot based on the new GNSS signals, and the detected relative position.

2. The positional measurement system according to claim 1,
    wherein the GNSS signal precision evaluation unit calculates precision evaluation values,
    wherein the communication channel quality evaluation unit calculates quality evaluation values,
    wherein the mobile robot further includes an evaluation value map creation unit that creates an evaluation value map including a fitness evaluation value indicating a fitness relating to relay of GNSS signals with regard to reception of the GNSS signals and communication with the inspection robot, for each position in a space, based on the precision evaluation values from the GNSS signal precision evaluation unit and quality evaluation values from the communication channel quality evaluation unit, and
    wherein the position control unit moves the mobile robot to, as the reception position, a position of a highest fitness evaluation value, based on the evaluation value map.

3. The positional measurement system according to claim 2,
    wherein, when the mobile robot is positioned at, as the reception position, the position of the highest fitness evaluation value, the GNSS signal precision evaluation unit evaluates the positional measurement precision of the received new GNSS signals, and also the communication channel quality evaluation unit newly evaluates the quality of the communication channel, and
    wherein, in a case of a first state where the calculated precision evaluation value of the received new GNSS signals is higher than the first threshold precision value, and the calculated quality evaluation value of the newly evaluated communication channel is higher than the first threshold quality value, the position calculation unit calculates the position of the inspection robot.

4. The positional measurement system according to claim 3,
    wherein, when the mobile robot is positioned at, as the reception position, the position of the highest fitness evaluation value, the GNSS signal reception unit receives further new GNSS signals, the GNSS signal precision evaluation unit evaluates the positional measurement precision of the received further new GNSS signals, and also the communication channel quality evaluation unit further newly evaluates the quality of the communication channel, and
    wherein, in a case of a second state where the precision evaluation value of the received further new by GNSS signals is lower than a second threshold precision value that is lower than the first threshold precision value, and the quality evaluation value of the further newly evaluated communication channel is lower than a second threshold quality value that is lower that the first threshold quality value, the evaluation value map creation unit updates the evaluation value map using the precision evaluation value of the received further new GNSS signals and the quality evaluation value of the further newly evaluated communication channel.

5. The positional measurement system according to claim 2,
wherein, when the mobile robot is positioned at, as the reception position, the position of the highest fitness evaluation value, the GNSS signal reception unit receives further new GNSS signals, the GNSS signal precision evaluation unit evaluates positional measurement precision of the received further new GNSS signals, and also the communication channel quality evaluation unit further newly evaluates the quality of the communication channel, and
wherein, in a case of a state that is different from both
 a first state where the precision evaluation value of the received further new GNSS signals is higher than the first threshold precision value, and the quality evaluation value of the further newly evaluated communication channel is higher than the first threshold quality value, and
 a second state where the precision evaluation value of the received further new by GNSS signals is lower than a second threshold precision value that is lower than the first threshold precision value, and the quality evaluation value of the further newly evaluated communication channel is lower than a second threshold quality value that is lower than the first threshold quality value,
 the position control unit moves the mobile robot to change a position thereof.

6. The positional measurement system according to claim 1,
wherein the new position of the mobile robot calculated by the GNSS signal reception unit is transmitted from the first mobile robot side communication unit to a second communication unit of the inspection robot.

7. The positional measurement system according to claim 1,
wherein the inspection robot further includes a GNSS signal reception unit that is different from the global navigation satellite system (GNSS) signal reception unit of the mobile robot, that receives the GNSS signals and calculates the position of the inspection robot based on the GNSS signals.

8. The positional measurement system according to claim 7,
wherein the inspection robot further includes a position integration unit that integrates positions of the inspection robot calculated by each of the position calculation unit and the GNSS signal reception unit that is different from the global navigation satellite system (GNSS) signal reception unit of the mobile robot.

9. The positional measurement system according to claim 7,
wherein the inspection robot further includes a position selection unit that selects a position of the inspection robot from positions of the inspection robot calculated by each of the position calculation unit and the second GNSS signal reception unit that is different from the global navigation satellite system (GNSS) signal reception unit of the mobile robot.

10. The positional measurement system according to claim 1,
wherein the inspection robot is mobile, and is a robot that performs surveying using the position of the inspection robot.

11. The positional measurement system according to claim 1, wherein the mobile robot further includes a fixing unit that fixes the position thereof.

12. The positional measurement system according to claim 1,
wherein the positional measurement precision is precision of the calculated position of the mobile robot based on the received GNSS signals, and
wherein the precision evaluation value is calculated based on the precision of the calculated position of the mobile robot based on the received GNSS signals.

13. A positional measurement method, used in a positional measurement system including a mobile robot and an inspection robot, comprising:
receiving GNSS signals by a global navigation satellite system (GNSS) signal reception unit of the mobile robot, and calculating a position of the mobile robot based on the GNSS signals;
evaluating, using the mobile robot, positional measurement precision of the received GNSS signals by calculating a precision evaluation value representing the positional measurement precision of the received GNSS signals and determining whether the calculated precision evaluation value is higher than a first threshold precision value;
communicating, using the mobile robot, with the inspection robot;
evaluating, using the mobile robot, the quality of a communication channel between the mobile robot and the inspection robot by calculating a quality evaluation value representing the quality of the communication channel and determining whether the calculated quality evaluation value is higher than a first threshold quality value;
moving the mobile robot to a reception position, where GNSS signals yielding a precision evaluation value higher than the first threshold precision value can be received and where a communication channel yielding a quality evaluation value higher than the first threshold quality value can be established;
receiving new GNSS signals by the GNSS signal reception unit of the mobile robot and calculating a new position of the mobile robot based on the received new GNSS signals when the mobile robot is positioned at the reception position;
outputting, using four or more pattern signal output devices of the mobile robot, four or more pattern signals which are different from each other when the mobile robot is positioned at the reception position, wherein the four or more pattern signal output devices are provided to different positions on the mobile robot;
receiving, using the pattern signal reception device of the inspection robot, the four or more pattern signals output from the four or more pattern signal output devices of the mobile robot positioned at the reception position;
calculating four or more distances from the pattern signal reception device to the four or more pattern signal output devices of the mobile robot at the reception position based on the received four or more pattern signals;

detecting a relative position of the inspection robot with respect to the mobile robot positioned at the reception position based on the calculated four or more distances; and calculating a position of the inspection robot based on the calculated new position of the mobile robot based on the new GNSS signals, and the detected relative position.

* * * * *